United States Patent
Heinze

(10) Patent No.: US 12,280,569 B2
(45) Date of Patent: Apr. 22, 2025

(54) SHEET-LIKE COMPOSITE FOR PRODUCING DIMENSIONALLY STABLE FOOD PRODUCT CONTAINERS WITH A BARRIER LAYER COMPRISING A BARRIER SUBSTRATE LAYER AND AN INWARDS-POINTING BARRIER MATERIAL LAYER

(71) Applicant: SIG SERVICES AG, Neuhausen am Rheinfall (CH)

(72) Inventor: Daniel Heinze, Linnich (DE)

(73) Assignee: SIG SERVICES AG, Neuhausen am Rheinfall (CH)

( * ) Notice: Subject to any disclaimer, the term of this patent is extended or adjusted under 35 U.S.C. 154(b) by 719 days.

(21) Appl. No.: 16/481,650

(22) PCT Filed: Jan. 12, 2018

(86) PCT No.: PCT/EP2018/050777
§ 371 (c)(1),
(2) Date: Jul. 29, 2019

(87) PCT Pub. No.: WO2018/137947
PCT Pub. Date: Aug. 2, 2018

(65) Prior Publication Data
US 2019/0389184 A1 Dec. 26, 2019

(30) Foreign Application Priority Data

Jan. 30, 2017 (DE) .......................... 102017201449.0

(51) Int. Cl.
*B32B 27/08* (2006.01)
*B32B 3/30* (2006.01)
(Continued)

(52) U.S. Cl.
CPC ................ *B32B 27/08* (2013.01); *B32B 3/30* (2013.01); *B32B 5/142* (2013.01); *B32B 7/12* (2013.01);
(Continued)

(58) Field of Classification Search
CPC .. B32B 1/02; B32B 27/08; B32B 3/30; B32B 5/142; B32B 7/12; B32B 27/10;
(Continued)

(56) References Cited

U.S. PATENT DOCUMENTS 5,156,330 A * 10/1992 Rosen .................... B65D 5/065
229/242
6,376,057 B1 * 4/2002 Akao ..................... B32B 27/10
428/512

(Continued)

FOREIGN PATENT DOCUMENTS

CN      1088536 A     6/1994
CN    104302550 A     1/2015
(Continued)

OTHER PUBLICATIONS

[NPL-1] Shiina et al. (JP 2002-154526 A); May 28, 2002 (EPO machine translation to English). (Year: 2002).*
(Continued)

*Primary Examiner* — Maria V Ewald
*Assistant Examiner* — Donald M Flores, Jr.
(74) *Attorney, Agent, or Firm* — Meunier Carlin & Curfman LLC

(57) ABSTRACT

The present invention relates to a sheet-like composite comprising as layers of a layer sequence in a direction from an outer side of the sheet-like composite to an inner side of the sheet-like composite
a) a carrier layer, and
b) a barrier layer comprising
(Continued)

i) a barrier substrate layer, and
ii) a barrier material layer;
wherein the barrier material layer has a thickness in a range from 1 nm to 1 µm; wherein the barrier material layer overlies the barrier substrate layer on a layer surface of the barrier substrate layer that faces the inner side. The invention further relates to methods for producing a sheet-like composite, a container precursor and a closed container, and also to the aforesaid method products; to a further container precursor; to a further closed container; and to a use of the sheet-like composite.

23 Claims, 6 Drawing Sheets

(51) Int. Cl.
| | |
|---|---|
| B32B 5/14 | (2006.01) |
| B32B 7/12 | (2006.01) |
| B32B 27/10 | (2006.01) |
| B32B 27/20 | (2006.01) |
| B32B 27/30 | (2006.01) |
| B32B 27/32 | (2006.01) |
| B32B 27/34 | (2006.01) |
| B32B 27/36 | (2006.01) |
| B32B 29/00 | (2006.01) |

(52) U.S. Cl.
CPC .............. *B32B 27/10* (2013.01); *B32B 27/20* (2013.01); *B32B 27/306* (2013.01); *B32B 27/308* (2013.01); *B32B 27/325* (2013.01); *B32B 27/327* (2013.01); *B32B 27/34* (2013.01); *B32B 27/36* (2013.01); *B32B 29/00* (2013.01); *B32B 2250/05* (2013.01); *B32B 2255/205* (2013.01); *B32B 2264/102* (2013.01); *B32B 2264/108* (2013.01); *B32B 2264/12* (2013.01); *B32B 2270/00* (2013.01); *B32B 2307/308* (2013.01); *B32B 2307/4026* (2013.01); *B32B 2307/516* (2013.01); *B32B 2307/518* (2013.01); *B32B 2307/558* (2013.01); *B32B 2307/714* (2013.01)

(58) Field of Classification Search
CPC ..... B32B 27/20; B32B 27/306; B32B 27/308; B32B 27/325; B32B 27/327; B32B 27/34; B32B 27/36; B32B 29/00; B32B 2250/05; B32B 2255/205; B32B 2264/102; B32B 2264/108; B32B 2264/12; B32B 2270/00; B32B 2307/308; B32B 2307/4026; B32B 2307/516; B32B 2307/518; B32B 2307/558; B32B 2307/714; B32B 2255/20; B32B 2307/718; B32B 2307/7244; B32B 2307/7246; B32B 2307/734; B32B 2435/02; B32B 2439/62; B32B 2439/70; B32B 27/32
See application file for complete search history.

(56) References Cited

U.S. PATENT DOCUMENTS

| | | | | |
|---|---|---|---|---|
| 8,158,226 | B2 * | 4/2012 | Oshita | B32B 7/12 |
| | | | | 427/372.2 |
| 2008/0107847 | A1 * | 5/2008 | Yamane | B32B 29/00 |
| | | | | 428/483 |
| 2009/0071103 | A1 | 3/2009 | Andersson | |
| 2010/0015423 | A1 * | 1/2010 | Schaefer | B32B 27/08 |
| | | | | 428/220 |
| 2011/0132975 | A1 * | 6/2011 | Toft | B32B 27/18 |
| | | | | 428/323 |
| 2013/0196101 | A1 | 8/2013 | Wolters et al. | |
| 2015/0225111 | A1 * | 8/2015 | Duisken | B65B 5/06 |
| | | | | 428/513 |

FOREIGN PATENT DOCUMENTS

| | | |
|---|---|---|
| DE | 102014015961 A1 | 5/2016 |
| DE | 102015010404 A1 | 3/2017 |
| EP | 0124772 A2 | 11/1984 |
| EP | 1535729 A1 | 1/2006 |
| EP | 2134773 A1 | 12/2009 |
| JP | H1053243 A | 2/1988 |
| JP | H08-183139 A | 7/1999 |
| JP | 2000-128144 A | 5/2000 |
| JP | 3145196 B2 | 3/2001 |
| JP | 2002154526 A * | 5/2002 |
| JP | 2002292778 A | 10/2002 |
| JP | 2002337292 A | 11/2002 |
| JP | 2003291947 A | 10/2003 |
| JP | 2009220275 A | 10/2009 |
| JP | 2010089821 A | 4/2010 |
| JP | 2013151296 A | 8/2013 |
| JP | 2013-203467 A | 10/2013 |
| JP | 2015036208 A | 2/2015 |
| WO | 2009112256 A1 | 9/2009 |
| WO | 2009131496 A1 | 10/2009 |
| WO | 2011003565 A2 | 1/2011 |
| WO | 2012093036 A1 | 7/2012 |
| WO | 2013093628 A1 | 6/2013 |
| WO | 2016005241 A1 | 1/2016 |
| WO | 2016008744 A1 | 1/2016 |
| WO | 2016066592 A1 | 5/2016 |

OTHER PUBLICATIONS

Office Action in connection to Chinese Application No. 201880007408. 8, dated Aug. 28, 2020.
INEOS Novex® M21N430 Product Technical Information LDPE extrusion coating product; Oct. 2007; 2 pages.
Kuraray EVAL™ L171B Datasheet—Typical Properties of EVAL™ EVOH (ethylene vinyl-alcohol compolymer) resin; Nov. 4, 2018; 1 page.
Yparex® 9207 Eigenschaftsdaten PE-LD; Feb. 4, 2009; 1 page.
DIN EN ISO 1183-1 Kunststoffe—Verfahren zur Bestimmung der Dichte von nicht verschäumten Kunststoffen—Teil 1: Eintauchverfahren, Verfahren mit Flüssigkeitspyknometer und Titrationsverfahren; Apr. 2013; 15 pages.
DIN EN ISO 307 Kunststoffe—Polyamide—Bestimmung der Viskositätszahl, Aug. 2013; 42 pages.
Exxon Escor™ 6000 EXCO, Ethylene Acrylic Acid Copolymer Resin; Jul. 1, 2011; 2 pages.
INEOS 23L430, Product Technical Information LDPE extrusion coating product; Feb. 2008; 3 pages.
INEOS 19N430, Product Technical Information LDPE extrusion coating product; Feb. 2008; 2 pages.
Eltex® PF1315AA, Product Technical Information C6 m-LLDPE for extrusion coating, injection moulding and compounding with a basic antioxidant additive package, Oct. 2009; 2 pages.
Specification sheet, GL-AEC-F; Jan. 31, 2014; 1 page.
ASTM F1249-13 Standard Test Method for Water Vapor Transmission Rate Through Plastic Film and Sheeting Using a Modulated Infrared Sensor; Nov. 2013; 6 pages.
ASTM D3985-05 Standard Test Method for Oxygen Gas Transmission Rate Through Plastic Film and Sheeting Using a Coulometric Sensor; Nov. 2010; 7 pages.
DIN EN ISO 1133-1 Kunststoffe—Bestimmung der Schmelze-Massefließrate (MFR) und der Schmelze-Volumenfließrate (MVR) von Thermoplasten—Teil 1: Allgemeines Prüfverfahren, Mar. 2012; 33 pages.
TPL Type: MT5000 metallised PET film 12my; Dec. 2012; 2 pages.
PCT/EP2018/050777; International Search Report and Written Opinion dated Mar. 7, 2018; 12 pages.

(56) References Cited

OTHER PUBLICATIONS

Second Office Action in connection to Chinese Application No. 201880007408.8, dated Jun. 29, 2021.
Office Action issued for Japanese Patent Application No. 2019-541149, dated Jan. 20, 2022. English Translation Included. 13 pages.
Office Action in connection to EP Application No. 18 700 565.7, dated Jun. 30, 2021.
Transparent Paper Ltd: "MT500 high barrier metallized PET films", Aug. 31, 2016 (Aug. 31, 2016).
Office Action issued for Japanese Patent Application No. 2019-541149, dated Dec. 13, 2022. English Translation Included. 9 pages.
Opposition filed on Mar. 21, 2023, in European Patent Application No. 18700565.7.
Lillienberg et al., "Outside vs. Inside Creasing—A Parameter Study" Master's Thesis ISRN LUTMDN/TMFL-09/5064-SE (2009).
Handbook of Beverage Packaging, ed G. A. Giles, Sheffield Academic Press, Chapter 8, "Packaging of Beverages in drinks cartons" (1999).
Paper and Paperboard Packaging Technology Chapter 13, ed. Mark J. Kirwan, Blackwell Publishing, 2005.
AIMCAL Metallizing Technical Reference extract (bibliographic data and part of p. 51), fifth edition, edited by Dr. Charles A. Bishop and Dr. Eldridge M. Mount III (May 2012).
Kim, "Investigation of high barrier materials development for long shelf-life dairy based products with enhanced properties," Master Thesis, Lund University, 2016.
Gregory, Extracts from Extrusion Coating: A Process Manual, Trafford Publishing, 2007.
Chapters 25 and 26 of Extrusion Coating Manual 4th Edition, ed. Thomas Bezigian, TAPPI Press, 1999.
Comments on Opposition in Japanese Patent Application No. JPH10-53243A.
Letter from the opponent dated Nov. 27, 2023, in European Patent Application No. 18700565.7.
Updated comments on Opposition in Japanese Patent Application No. JPH10-53243A.
Wikipedia, "Vacuum deposition," accessed Nov. 15, 2023, at https://en.wikipedia.org/wiki/Vacuum_deposition.
Wikipedia, "Metallised film," access Nov. 15, 2023, at https://en.wikipedia.org/wiki/Metallised_film.
Written Opposition Report issued on Feb. 14, 2024, in Japanese Patent No. 7278951 and machine translation.

\* cited by examiner

100

200

300

400

500

SHEET-LIKE COMPOSITE FOR PRODUCING DIMENSIONALLY STABLE FOOD PRODUCT CONTAINERS WITH A BARRIER LAYER COMPRISING A BARRIER SUBSTRATE LAYER AND AN INWARDS-POINTING BARRIER MATERIAL LAYER

The present invention relates to a sheet-like composite comprising as layers of a layer sequence in a direction from an outer side of the sheet-like composite to an inner side of the sheet-like composite
  a) a carrier layer, and
  b) a barrier layer comprising
    i) a barrier substrate layer, and
    ii) a barrier material layer;
wherein the barrier material layer has a thickness in a range from 1 nm to 1 μm; wherein the barrier material layer overlies the barrier substrate layer on a layer surface of the barrier substrate layer that faces the inner side. The invention further relates to methods for producing a sheet-like composite, a container precursor and a closed container, and also to the aforesaid method products; to a further container precursor; to a further closed container; and to a use of the sheet-like composite.

For a long time, food products, be it food products for human consumption or else animal food products, have been preserved by storing them either in a can or in an item of glassware closed with a lid. Here, shelf life can firstly be increased by separately sterilizing the food product and the container, in this case an item of glassware or a can, to the maximum possible extent and then filling the food product into the container and closing said container. However, these tried and tested measures for increasing the shelf life of food products have a range of disadvantages, for example an again necessary downstream sterilization. Owing to their essentially cylindrical shape, cans and glassware have the disadvantage that a highly dense and space-saving storage is not possible. Moreover, cans and glassware have a considerable inherent weight, which leads to an increased energy expenditure during transport. In addition, a rather high energy expenditure is required for the production of glass, tinplate or aluminium, even if the raw materials used for this purpose come from recycling. In the case of glassware, an increased transport expenditure is an additional complicating factor. The items of glassware are usually pre-manufactured in a glass factory and must then be transported with utilization of considerable transport volumes to the food product filling plant. Furthermore, glassware and cans can only be opened with a considerable expenditure of force or with the aid of tools and thus rather inconveniently. In the case of cans, an additional factor is a high risk of injury due to sharp edges arising during opening. In the case of glassware, a common occurrence is that glass splinters get into the food product during filling or opening of the filled glassware, and can lead in the worst case to internal injuries during consumption of the food product. Moreover, both cans and glassware must be fitted with labels in order to identify and advertise the food-product contents. The glassware and cans cannot readily be directly printed with information and advertisements. Thus, in addition to the actual print, a substrate for this, a piece of paper or a suitable film, and also a fastener, an adhesive or a seal are required.

Other packaging systems are known from the prior art for storing food products over a long period with minimum impairments. These are containers produced from sheet-like composites—frequently also referred to as laminates. Such sheet-like composites are frequently constructed from a thermoplastics layer, a carrier layer which usually consists of cardboard or paper and which gives the container dimensional stability, an adhesion promoter layer, a barrier layer and a further plastics layer, as disclosed in, inter alia, WO 90/09926 A2. Since the carrier layer gives dimensional stability to the container made from the laminate, these containers, in contrast to film bags, are to be considered as a further development of the aforementioned glassware and cans.

Here, these laminate containers already have many advantages over the conventional glassware and cans. Nevertheless, there are also possibilities of improvement for these packaging systems. For instance, in the prior art, the barrier layer typically consists of an aluminium foil several μm in thickness. Aluminium is a material which is comparatively energy-intensive and resource-intensive to produce. Further, the aluminium foil makes it more difficult to recycle the laminate after the prior-art container has been used. Consequently, for reasons of environmental protection, there has for some time been a need for a laminate that is suitable for producing food product containers with as little metal as possible, more particularly as little aluminium as possible. Furthermore, there has for a long time been a need for microwave-compatible food product containers. For this reason as well, there is a need for a laminate suitable for producing food product containers and comprising as little metal as possible, more particularly as little aluminium as possible. A particular desire in this context is that the aforesaid disadvantages should be overcome as far as possible without deleterious consequences for the shelf life of food products stored in the containers.

In general, it is an object of the present invention to at least partly overcome a disadvantage arising from the prior art. It is a further object of the invention to provide a laminate for producing dimensionally stable food product containers that is as eco-friendly as possible and allows maximum shelf life of the food product in the container. For this purpose, the laminate preferably comprises an advantageous combination of a maximum oxygen and water vapour barrier effect. According to a further object of the invention, the aforesaid laminate is additionally suitable for containing the food product during heating in a microwave oven. A further object of the invention is to provide a laminate for producing dimensionally stable food product containers that exhibits particularly good processing properties when the food product container is being produced from the laminate. In this context, preferably, there is as little reduction as possible in the barrier effect of the laminate with respect to water vapour and oxygen during the processing of the laminate to form the container. A further object of the invention is to provide a laminate for producing dimensionally stable food product containers that is especially suitable for producing food product containers having a small capacity and a maximum shelf life. According to another object of the invention, the aforesaid advantageous laminate is obtainable as conveniently as possible, preferably from as little starting material as possible. A particular object of the invention is to provide the aforesaid advantageous laminate with the laminate having an as simple as possible construction, preferably as few layers as possible. A further object of the invention is to provide the aforesaid advantageous laminate with a minimal basis weight. Doing so proves to be particularly advantageous particularly during transport of substantial quantities of food product containers, since limiting factors on transport capacities include not only the footprint but also the weight of the containers. A further object of the invention is to provide a dimensionally stable food product container made from the aforesaid advantageous laminate. It is an object of the invention, furthermore, to provide a method for producing a dimensionally stable food product container from the aforesaid advantageous laminate.

A contribution to at least partly satisfying at least one, preferably more than one, of the above objects is made by the independent claims. The dependent claims provide preferred embodiments which contribute to at least partly satisfying at least one of the objects.

A contribution to satisfying at least one of the objects according to the invention is made by an embodiment 1 of a sheet-like composite 1 containing as layers of a layer sequence in a direction from an outer side of the sheet-like composite to an inner side of the sheet-like composite
  a) a carrier layer, and
  b) a barrier layer comprising
   i) a barrier substrate layer, and
   ii) a barrier material layer;
wherein the barrier material layer has a thickness in a range from 1 nm to 1 µm, preferably from 1 to 800 nm, more preferably from 1 to 600 nm, more preferably from 1 to 400 nm, more preferably from 1 to 300 nm, more preferably from 1 to 200 nm, more preferably from 1 to 100 nm, most preferably from 3 to 80 nm, wherein the barrier material layer overlies the barrier substrate layer on a layer surface of the barrier substrate layer that faces the inner side. A preferred barrier layer is an oxygen barrier layer or a water vapour barrier layer or both. An oxygen barrier layer exhibits a barrier effect with respect to permeation of oxygen. A water vapour barrier layer exhibits a barrier effect with respect to permeation of water vapour. In addition, the barrier layer preferably has a barrier effect towards visible light.

In an inventive embodiment 2, the sheet-like composite 1 is designed according to embodiment 1, wherein the barrier layer has a thickness in a range from 2 to 35 µm, preferably from 2 to 33 µm, more preferably from 2 to 30 µm, more preferably from 3 to 27 µm, more preferably from 4 to 25 µm, most preferably from 5 to 20 µm.

In an inventive embodiment 3, the sheet-like composite 1 is designed according to embodiment 1 or 2, wherein the barrier substrate layer adjoins the barrier material layer. The barrier layer preferably consists of the barrier substrate layer and the barrier material layer. The barrier substrate layer is preferably joined directly to the barrier material layer, preferably by intermolecular bonds or covalent bonds or both.

In an inventive embodiment 4, the sheet-like composite 1 is designed according to one of the preceding embodiments, wherein the barrier layer has an oxygen permeation rate in a range from 0.1 to 40 $cm^3/(m^2 \cdot d \cdot bar)$, preferably from 0.2 to 35 $cm^3/(m^2 \cdot d \cdot bar)$, more preferably from 0.3 to 30 $cm^3/(m^2 \cdot d \cdot bar)$.

In an inventive embodiment 5, the sheet-like composite 1 is designed according to one of the preceding embodiments, wherein the sheet-like composite has an oxygen permeation rate in a range from 0.1 to 35 $cm^3/(m^2 \cdot d \cdot bar)$, preferably from 0.2 to 30 $cm^3/(m^2 \cdot d \cdot bar)$, more preferably from 0.3 to 25 $cm^3/(m^2 \cdot d \cdot bar)$.

In an inventive embodiment 6, the sheet-like composite 1 is designed according to one of the preceding embodiments, wherein the barrier layer has a water vapour permeation rate in a range from 0.1 to 40 $g/(m^2 \cdot d)$, preferably from 0.2 to 35 $g/(m^2 \cdot d)$, more preferably from 0.3 to 30 $g/(m^2 \cdot d)$.

In an inventive embodiment 7, the sheet-like composite 1 is designed according to one of the preceding embodiments, wherein the sheet-like composite has a water vapour permeation rate in a range from 0.1 to 35 $g/(m^2 \cdot d)$, preferably from 0.2 to 30 $g/(m^2 \cdot d)$, more preferably from 0.3 to 25 $g/(m^2 \cdot d)$.

In an inventive embodiment 8, the sheet-like composite 1 is designed according to one of the preceding embodiments, wherein the barrier substrate layer comprises a polymer to an extent of at least 50% by weight, preferably of at least 60% by weight, more preferably of at least 70% by weight, more preferably of at least 80% by weight, most preferably of at least 90% by weight, based in each case on the weight of the barrier substrate layer. A preferred polymer in this context is an oriented polymer. The oriented polymer is preferably monoaxially oriented or biaxially oriented. A further preferred polymer is a thermoplastic polymer. The barrier substrate layer preferably consists of the polymer.

In an inventive embodiment 9, the sheet-like composite 1 is designed according to embodiment 8, wherein the polymer is selected from the group consisting of a polycondensate, a polyethylene, a polypropylene, a polyvinyl alcohol, or a combination of at least two thereof. A preferred polypropylene is oriented, more particularly longitudinally drawn (oPP) or biaxially drawn (BoPP). A preferred polycondensate is a polyester or polyamide (PA) or both. A preferred polyester is one selected from the group consisting of a polyethylene terephthalate (PET), a polylactide (PLA), or a combination of at least two thereof. A preferred polyvinyl alcohol is a vinyl alcohol copolymer. A preferred vinyl alcohol copolymer is an ethylene-vinyl alcohol copolymer.

In an inventive embodiment 10, the sheet-like composite 1 is designed according to one of the preceding embodiments, wherein the barrier material layer comprises a barrier material to an extent of at least 50% by weight, preferably of at least 60% by weight, more preferably of at least 70% by weight, more preferably of at least 80% by weight, most preferably of at least 90% by weight, based in each case on the weight of the barrier material layer. The barrier material layer preferably consists of the barrier material.

In an inventive embodiment 11, the sheet-like composite 1 is designed according to embodiment 10, wherein the barrier material is one selected from the group consisting of an oxide, a metal, a silicon-containing compound, and a polymer, or a combination of at least two thereof. A preferred oxide is an oxide of one selected from the group consisting of one or more metals, one or more semi-metals and one or more non-metals, or a combination of at least two thereof, such as of $Al_2O_3$ and $SiO_2$, for example. A preferred oxide of a metal is one selected from the group consisting of an aluminium oxide, for example $Al_2O_3$; a magnesium oxide, for example MgO; a titanium oxide, for example $TiO_2$; a tin oxide, for example an indium tin oxide (ITO), $Zn_2SnO_4$, SnO, $Sn_2O_3$ and $SnO_2$; a zinc oxide, for example ZnO; and an indium oxide, for example an indium tin oxide (ITO), InO, $In_2O_3$ and $InO_2$; or a combination of at least two thereof. A preferred oxide of a semi-metal is a silicon oxide, for example $SiO_2$. A preferred metal is aluminium. A preferred silicon-containing compound is a silicon nitride, for example $Si_3N_4$, or an organosilicon compound. A preferred organosilicon compound is a siloxane. A polymer preferred as barrier material is a vinyl polymer or a polyacrylic acid or both. A preferred vinyl polymer is a polyvinylidene chloride (PVdC) or a polyvinyl alcohol (PVOH) or both.

In an inventive embodiment 13, the sheet-like composite 1 is designed according to one of the preceding embodiments, wherein the sheet-like composite comprises a linear depression on the outer side. A preferred linear depression has a length of at least 1 cm, preferably of at least 2 cm, more preferably of at least 10 cm. A particularly preferred linear depression extends from a first edge of the sheet-like composite to a further edge, preferably opposite the first edge, of the sheet-like composite. A further preferred linear depression is a linear displacement of material. A preferred linear displacement of material is a groove.

In an inventive embodiment 14, the sheet-like composite 1 is designed according to one of the preceding embodiments, wherein the barrier layer is characterized by an aluminium content of less than 50% by weight, preferably of less than 40% by weight, more preferably of less than 30% by weight, more preferably of less than 20% by weight, more preferably of less than 10% by weight, most preferably of less than 5% by weight, based in each case on the weight of the barrier layer. A preferred barrier layer contains no aluminium.

In an inventive embodiment 15, the sheet-like composite 1 is designed according to one of the preceding embodiments, wherein the barrier layer is characterized by a metal content of less than 50% by weight, preferably of less than 40% by weight, more preferably of less than 30% by weight, more preferably of less than 20% by weight, more preferably of less than 10% by weight, most preferably of less than 5% by weight, based in each case on the weight of the barrier layer. A preferred barrier layer contains no metal.

In an inventive embodiment 16, the sheet-like composite 1 is designed according to one of the preceding embodiments, wherein the sheet-like composite is characterized by an aluminium content of less than 10% by weight, more preferably of less than 8% by weight, most preferably of less than 5% by weight, based in each case on the weight of the sheet-like composite. A preferred sheet-like composite contains no aluminium.

In an inventive embodiment 17, the sheet-like composite 1 is designed according to one of the preceding embodiments, wherein the sheet-like composite is characterized by a metal content of less than 10% by weight, more preferably of less than 8% by weight, most preferably of less than 5% by weight, based in each case on the weight of the sheet-like composite. A preferred sheet-like composite contains no metal.

In an inventive embodiment 18, the sheet-like composite 1 is designed according to one of the preceding embodiments, wherein a layer surface of the barrier layer, preferably of the barrier material layer, that faces the inner side of the sheet-like composite adjoins a first adhesion promoter layer. The first adhesion promoter layer preferably has a thickness in a range from 1.5 to 20 µm, more preferably from 2 to 15 µm.

In an inventive embodiment 19, the sheet-like composite 1 is designed according to embodiment 18, wherein the first adhesion promoter layer comprises an acrylic acid copolymer.

In an inventive embodiment 20, the sheet-like composite 1 is designed according to one of the preceding embodiments, wherein a layer surface of the barrier layer, preferably of the barrier substrate layer, that faces the outer side of the sheet-like composite adjoins a further adhesion promoter layer.

In an inventive embodiment 21, the sheet-like composite 1 is designed according to embodiment 20, wherein the further adhesion promoter layer comprises an ethylene-alkyl acrylate copolymer. Selected preferably as alkyl group is a methyl, ethyl, propyl, isopropyl, butyl, isobutyl or a pentyl group. With further preference the adhesion promoter layer may have mixtures of two or more different ethylene-alkyl acrylate copolymers. Preferably as well the ethylene-alkyl acrylate copolymer may have two or more different alkyl groups in the acrylate function, for example an ethylene-alkyl acrylate copolymer in which both methyl acrylate units and ethyl acrylate units occur in the same copolymer.

In an inventive embodiment 22, the sheet-like composite 1 is designed according to one of the preceding embodiments, wherein the sheet-like composite further comprises an outer polymer layer, the outer polymer layer overlying the carrier layer on a side of the carrier layer that faces the outer side of the sheet-like composite. A preferred outer polymer layer comprises an LDPE to an extent of at least 50% by weight, preferably at least 60% by weight, more preferably at least 70% by weight, more preferably still at least 80% by weight, most preferably at least 90% by weight, based in each case on the weight of the outer polymer layer.

In an inventive embodiment 23, the sheet-like composite 1 is designed according to one of the preceding embodiments, wherein the sheet-like composite further comprises an inner polymer layer, the inner polymer layer overlying the barrier layer on a side of the barrier layer that faces the inner side of the sheet-like composite. The inner polymer layer preferably comprises a polymer prepared by means of a metallocene catalyst, to an extent of 10% to 90% by weight, preferably 25% to 90% by weight, more preferably 30% to 80% by weight, based in each case on the total weight of the inner polymer layer. In a further preferred embodiment, the inner polymer layer comprises a polymer blend, the polymer blend comprising an mPE to an extent of 10% to 90% by weight, preferably 25% to 90% by weight, more preferably 30% to 80% by weight, and a further polymer to an extent of at least 10% by weight, preferably at least 15% by weight, more preferably at least 20% by weight, based in each case on the total weight of the polymer blend.

In an inventive embodiment 24, the sheet-like composite 1 is designed according to embodiment 22 or 23, wherein the outer polymer layer is overlaid on a side of the outer polymer layer that faces away from the carrier layer with an application of colour, preferably a decoration. The application of colour preferably comprises at least one colourant, more preferably at least 2, more preferably at least 3, more preferably at least 4, more preferably still at least 5, most preferably at least 6 colourants.

In an inventive embodiment 25, the sheet-like composite 1 is designed according to one of the preceding embodiments, wherein the sheet-like composite comprises an intermediate polymer layer between the carrier layer and the barrier layer. A preferred intermediate polymer layer comprises an LDPE to an extent of at least 50% by weight, more preferably at least 60% by weight, more preferably at least 70% by weight, more preferably at least 80% by weight, most preferably at least 90% by weight, based in each case on the weight of the intermediate polymer layer. The intermediate polymer layer preferably adjoins a layer surface of the barrier substrate layer that faces the outer side of the sheet-like composite. The intermediate polymer layer preferably has a thickness in a range from 10 to 30 µm, more preferably from 12 to 28 µm.

In an inventive embodiment 26, the sheet-like composite 1 is designed according to one of the preceding embodiments, wherein the carrier layer has at least one hole, the hole being covered at least by the barrier layer. The hole is preferably further covered by one selected from the group consisting of the inner polymer layer, the outer polymer layer and the intermediate polymer layer, or a combination of at least two thereof. Layers which cover the hole are referred to herein as hole cover layers. Where at least 2 hole cover layers are present, the hole cover layers in the hole preferably form a layer sequence of layers joined to one another in the hole.

In an inventive embodiment 27, the sheet-like composite 1 is designed according to one of the preceding embodiments, wherein the carrier layer comprises, preferably consists of, one selected from the group consisting of cardboard, paper board and paper, or a combination of at least two thereof.

A contribution to satisfying at least one of the objects according to the invention is made by an embodiment 1 of a method 1 comprising as method steps
a) providing
   i) a sheet-like composite precursor, containing a carrier layer, and
   ii) a barrier layer, containing
      A) a barrier substrate layer, and
      B) a barrier material layer overlying the barrier substrate layer; and
b) overlaying the carrier layer with the barrier layer, thereby obtaining a sheet-like composite;
wherein the barrier material layer has a thickness in a range from 1 nm to 1 µm, preferably from 1 to 800 nm, more preferably from 1 to 600 nm, more preferably from 1 to 400 nm, more preferably from 1 to 300 nm, more preferably from 1 to 200 nm, more preferably from 1 to 100 nm, most preferably from 3 to 80 nm; wherein, during the overlaying in method step b), the barrier material layer is located on a side of the barrier substrate layer that faces away from the carrier layer. The method 1 is preferably a method for producing the sheet-like composite. The barrier layer is preferably designed according to an embodiment of the sheet-like composite 1. The overlaying in method step b) is accomplished preferably in the form of laminating.

In an inventive embodiment 2, the method 1 is designed according to embodiment 1, wherein the barrier layer has a thickness in a range from 2 to 35 µm, preferably from 2 to 33 µm, more preferably from 2 to 30 µm, more preferably from 3 to 27 µm, more preferably from 4 to 25 µm, most preferably from 5 to 20 µm.

In an inventive embodiment 3, the method 1 is designed according to embodiment 1 or 2, wherein the barrier substrate layer adjoins the barrier material layer.

In an inventive embodiment 4, the method 1 is designed according to one of embodiments 1 to 3, wherein the barrier layer has an oxygen permeation rate in a range from 0.1 to 40 $cm^3/(m^2 \cdot d \cdot bar)$, preferably from 0.2 to 35 $cm^3/(m^2 \cdot d \cdot bar)$, more preferably from 0.3 to 30 $cm^3/(m^2 \cdot d \cdot bar)$.

In an inventive embodiment 5, the method 1 is designed according to one of embodiments 1 to 4, wherein the barrier layer has a water vapour permeation rate in a range from 0.1 to 40 $g/(m^2 \cdot d)$, preferably from 0.2 to 35 $g/(m^2 \cdot d)$, more preferably from 0.3 to 30 $g/(m^2 \cdot d)$.

In an inventive embodiment 6, the method 1 is designed according to one of embodiments 1 to 5, wherein the barrier substrate layer comprises a polymer to an extent of at least 50% by weight, preferably of at least 60% by weight, more preferably of at least 70% by weight, more preferably of at least 80% by weight, most preferably of at least 90% by weight, based in each case on the weight of the barrier substrate layer.

In an inventive embodiment 7, the method 1 is designed according to embodiment 6, wherein the polymer is selected from the group consisting of a polycondensate, a polyethylene, a polypropylene, a polyvinyl alcohol, or a combination of at least two thereof.

In an inventive embodiment 8, the method 1 is designed according to one of embodiments 1 to 7, wherein the barrier material layer comprises a barrier material to an extent of at least 50% by weight, preferably of at least 60% by weight, more preferably of at least 70% by weight, more preferably of at least 80% by weight, most preferably of at least 90% by weight, based in each case on the weight of the barrier material layer.

In an inventive embodiment 9, the method 1 is designed according to embodiment 8, wherein the barrier material is one selected from the group consisting of an oxide, a metal, a silicon-containing compound, and a polymer, or a combination of at least two thereof.

In an inventive embodiment 11, the method 1 is designed according to one of embodiments 1 to 10, wherein the method further comprises a method step
c) contacting a layer surface of the barrier layer that faces away from the carrier layer with a first adhesion promoter composition, thereby obtaining a first adhesion promoter layer.

The layer surface of the barrier layer in method step c) is preferably a layer surface of the barrier material layer.

In an inventive embodiment 12, the method 1 is designed according to embodiment 11, wherein the first adhesion promoter composition comprises an acrylic acid copolymer.

In an inventive embodiment 13, the method 1 is designed according to one of embodiments 1 to 12, wherein the barrier layer, preferably the barrier substrate layer, is contacted in method step b) on a layer surface facing the carrier layer with a further adhesion promoter composition, thereby obtaining a further adhesion promoter layer.

In an inventive embodiment 14, the method 1 is designed according to embodiment 13, wherein the further adhesion promoter composition comprises an ethylene-alkyl acrylate copolymer. Selected preferably as alkyl group is a methyl, ethyl, propyl, isopropyl, butyl, isobutyl or a pentyl group. With further preference the adhesion promoter layer may have mixtures of two or more different ethylene-alkyl acrylate copolymers. Also preferably, the ethylene-alkyl acrylate copolymer may have two or more different alkyl groups in the acrylate function, for example an ethylene-alkyl acrylate copolymer in which both methyl acrylate units and ethyl acrylate units occur in the same copolymer.

In an inventive embodiment 15, the method 1 is designed according to one of embodiments 1 to 14, wherein an intermediate polymer layer is introduced in method step b) between the carrier layer and the barrier layer. In this case the intermediate polymer layer is preferably contacted with a layer surface of the barrier substrate layer that faces away from the barrier material layer.

In an inventive embodiment 16, the method 1 is designed according to one of embodiments 1 to 15, wherein the overlaying in method step b) is accomplished such that a first side of the carrier layer faces the barrier layer in the sheet-like composite, the carrier layer being overlaid, before method step b), on a side that faces away from the first side of the carrier layer, with an outer polymer composition. A preferred outer polymer composition comprises an LDPE to an extent of at least 50% by weight, preferably at least 60% by weight, more preferably at least 70% by weight, more preferably still at least 80% by weight, most preferably at least 90% by weight, based in each case on the weight of the outer polymer composition.

In an inventive embodiment 17, the method 1 is designed according to one of embodiments 1 to 16, wherein the method further comprises a method step
   d) overlaying the barrier layer, on a side of the barrier layer that faces away from the carrier layer, with an inner polymer composition, thereby obtaining an inner polymer layer.

The inner polymer composition preferably comprises a polymer prepared by means of a metallocene catalyst, to an extent of 10% to 90% by weight, preferably 25% to 90% by weight, more preferably 30% to 80% by weight, based in each case on the total weight of the inner polymer composition. In a further preferred embodiment, the inner polymer composition comprises a polymer blend, the polymer blend comprising an mPE to an extent of 10% to 90% by weight, preferably 25% to 90% by weight, more preferably 30% to 80% by weight, and a further polymer to an extent of at least 10% by weight, preferably at least 15% by weight, more preferably at least 20% by weight, based in each case on the total weight of the polymer blend. Method steps c) and d) preferably take place simultaneously, preferably by coextrusion of the adhesion promoter composition and of the inner polymer composition.

In an inventive embodiment 18, the method 1 is designed according to one of embodiments 1 to 17, wherein at least one hole is made in the carrier layer before method step b), the hole being covered at least by the barrier layer in method step b).

In an inventive embodiment 19, the method 1 is designed according to one of embodiments 1 to 18, wherein the overlaying in method step b) is accomplished so that in the sheet-like composite, a first side of the carrier layer faces the barrier layer, the method further comprising a method step I), with a linear depression being made in the carrier layer on a side facing away from the first side of the carrier layer in method step I). A preferred making of a linear depression is grooving. Grooving is accomplished preferably by causing a grooving tool to act on the carrier layer. The causing to act may be accomplished by contact with the carrier layer on the side facing away from the first side of the carrier layer, or by contact with an outer polymer layer, obtained from the outer polymer composition, on a side of the outer polymer layer that faces away from the carrier layer, or by both. The linear depression may be made before or after method step b). The linear depression is preferably made after method step b).

In an inventive embodiment 20, the method 1 is designed according to one of embodiments 1 to 19, wherein the barrier layer is characterized by an aluminium content of less than 50% by weight, preferably of less than 40% by weight, more preferably of less than 30% by weight, more preferably of less than 20% by weight, more preferably of less than 10% by weight, most preferably of less than 5% by weight, based in each case on the weight of the barrier layer. A particularly preferred barrier layer is free from aluminium.

In an inventive embodiment 21, the method 1 is designed according to one of embodiments 1 to 20, wherein the barrier layer is characterized by a metal content of less than 50% by weight, preferably of less than 40% by weight, more preferably of less than 30% by weight, more preferably of less than 20% by weight, more preferably of less than 10% by weight, most preferably of less than 5% by weight, based in each case on the weight of the barrier layer. A preferred barrier layer contains no metal.

A contribution to satisfying at least one of the objects according to the invention is made by an embodiment 1 of a sheet-like composite 2, obtainable by the method 1 according to one of its embodiments 1 to 21.

A contribution to satisfying at least one of the objects according to the invention is made by an embodiment 1 of a container precursor 1, comprising the sheet-like composite 1 according to one of its embodiments 1 to 27 or the sheet-like composite 2 according to its embodiment 1.

In an inventive embodiment 2, the container precursor 1 is designed according to embodiment 1, wherein the sheet-like composite has at least 3, more preferably at least 4, folds.

In an inventive embodiment 3, the container precursor 1 is designed according to embodiment 1 or 2, wherein the sheet-like composite comprises a first longitudinal edge and a further longitudinal edge, the first longitudinal edge being joined to the further longitudinal edge, forming a longitudinal seam of the container precursor.

A contribution to satisfying at least one of the objects according to the invention is made by an embodiment 1 of a closed container 1 comprising the sheet-like composite 1 according to one of its embodiments 1 to 27 or the sheet-like composite 2 according to its embodiment 1.

In an inventive embodiment 2, the closed container 1 is designed according to embodiment 1, wherein the sheet-like composite comprises a first longitudinal edge and a further longitudinal edge, the first longitudinal edge being joined to the further longitudinal edge, forming a longitudinal seam of the closed container.

In an inventive embodiment 3, the closed container 1 is designed according to embodiment 1 or 2, wherein the closed container contains a food product.

In an inventive embodiment 4, the closed container 1 is designed according to one of embodiments 1 to 3, wherein the closed container surrounds at least partially an internal volume in a range from 20 to 2000 ml, preferably from 30 to 1500 ml, more preferably from 40 to 1000 ml.

A contribution to satisfying at least one of the objects according to the invention is made by an embodiment 1 of a method 2 comprising as method steps
   A. providing the sheet-like composite 1 according to one of its embodiments 1 to 27 or the sheet-like composite 2 according to its embodiment 1, in each case comprising a first longitudinal edge and a further longitudinal edge;
   B. folding the sheet-like composite; and
   C. contacting the first longitudinal edge with the further longitudinal edge and joining the first longitudinal edge to the further longitudinal edge, thereby obtaining a longitudinal seam.

The folding in method step B. takes place preferably along the linear depression.

A contribution to satisfying at least one of the objects according to the invention is made by an embodiment 1 of a container precursor 2 obtainable by the method 2 according to its embodiment 1.

A contribution to satisfying at least one of the objects according to the invention is made by an embodiment 1 of a method 3 comprising as method steps
   i. providing the container precursor 1 according to one of its embodiments 1 to 3, or the container precursor 2 according to its embodiment 1;
   ii. forming a base region of the container precursor by folding the sheet-like composite;
   iii. closing the base region;
   iv. filling the container precursor with a food product, and
   v. closing the container precursor in a head region, thereby obtaining a closed container.

In an inventive embodiment 2, the method 3 is designed according to embodiment 1, wherein the method further comprises a method step vi. joining the closed container to an opening aid.

A contribution to satisfying at least one of the objects according to the invention is made by an embodiment 1 of a closed container 2 obtainable by the method 3 according to its embodiment 1 or 2.

A contribution to satisfying at least one of the objects according to the invention is made by an embodiment 1 of a use of the sheet-like composite 1 according to one of its embodiments 1 to 27 or the sheet-like composite 2 according to its embodiment 1 for producing a food product container.

Features described as preferred in one category of the invention, for example according to the sheet-like composite 1, are similarly preferred in an embodiment of the other categories according to the invention, for example an embodiment of the inventive method 1.

Barrier Layer

The barrier layer preferably has a sufficient barrier effect with respect to oxygen or water vapour or both. Accordingly, the barrier layer is preferably an oxygen barrier layer or a water vapour barrier layer or both. Additionally, the barrier layer preferably has a barrier effect with respect to visible light.

In accordance with the invention it may prove advantageous if the barrier substrate layer or the barrier material layer, or both, possesses in each case a melting temperature in a range from more than 155 to 300° C., preferably in a range from 160 to 280° C. and particularly preferably in a range from 170 to 270° C. Preferably, moreover, the barrier layer may also be introduced via lamination into the sheet-like composite.

Barrier Substrate Layer

The barrier substrate layer may consist of any material which appears to the person skilled in the art to be suitable for use as inventive barrier substrate layer. In this context the barrier substrate layer is preferably suitable for being coated with a barrier material to reach an inventive thickness of the barrier material layer. One layer surface is preferably sufficiently smooth in form for this purpose. With further preference, the barrier substrate layer has a thickness in a range from 3 to 30 μm, preferably from 2 to 28 μm, more preferably from 2 to 26 μm, more preferably from 3 to 24 μm, more preferably from 4 to 22 μm, most preferably from 5 to 20 μm. The barrier substrate layer preferably also has a barrier effect against oxygen or water vapour or both. A barrier effect of the barrier material layer against permeation of oxygen is preferably greater than a barrier effect of the barrier substrate layer against permeation of oxygen. The barrier substrate layer preferably has an oxygen permeation rate in a range from 0.1 to 50 cm³/(m²·d·bar), preferably from 0.2 to 40 cm³/(m²·d·bar), more preferably from 0.3 to 30 cm³/(m²·d·bar). A preferred barrier substrate layer comprises, more preferably consists of, cellulose or a polymer or both. A preferred polymer in this context is an oriented polymer. The oriented polymer is preferably monoaxially oriented or biaxially oriented. Another preferred polymer is a thermoplastic polymer. The barrier substrate layer preferably consists of the polymer.

The barrier substrate layer preferably comprises a polymer selected from the group consisting of a polycondensate, a polyethylene, a polypropylene, a polyvinyl alcohol or a combination of at least two thereof to an extent of at least 50% by weight, preferably of at least 60% by weight, more preferably of at least 70% by weight, more preferably of at least 80% by weight, most preferably of at least 90% by weight, based in each case on the weight of the barrier substrate layer. More preferably the barrier substrate layer consists of the aforesaid polymer. A preferred polypropylene is oriented, more particularly longitudinally drawn (oPP) or biaxially drawn (BoPP). A preferred polycondensate is a polyester or polyamide (PA) or both. A preferred polyester is one selected from the group consisting of a polyethylene terephthalate (PET), a polylactide (PLA), or a combination of at least two thereof. A preferred vinyl polymer is a vinyl alcohol copolymer or a polyvinyl alcohol or both. A preferred polyvinyl alcohol is a vinyl alcohol copolymer. A preferred vinyl alcohol copolymer is an ethylene-vinyl alcohol copolymer.

Suitability among the polyamides is possessed by all PAs which appear suitable to the person skilled in the art for the inventive employment. Particularly noteworthy here are PA 6, PA 6.6, PA 6.10, PA 6.12, PA 11 or PA 12, or a mixture of at least two thereof, with PA 6 and PA 6.6 being particularly preferred and PA 6 being further preferred. PA 6 is available commercially for example under the trade names Akulon®, Durethan® and Ultramid®. Suitable furthermore are amorphous polyamides such as, for example, MXD6, Grivory® and also Selar® PA. It is further preferred for the PA to have a density in a range from 1.01 to 1.40 g/cm³, preferably in a range from 1.05 to 1.30 g/cm³ and particularly preferably in a range from 1.08 to 1.25 g/cm³. It is preferred, furthermore, for the PA to have a viscosity number in a range from 130 to 250 ml/g and preferably in a range from 140 to 220 ml/g.

Contemplated as EVOH are all EVOHs which appear suitable to the person skilled in the art for the inventive employment. Examples thereof are available commercially under trade names including that of EVAL™ from EVAL Europe NV, Belgium in a multiplicity of different versions, examples being the varieties EVAL™ F104B or EVAL™ L171B. Preferred EVOHs possess at least one, two, a plurality of or all of the following properties:

an ethylene content in a range from 20 to 60 mol %, preferably from 24 to 45 mol %;

a density in a range from 1.0 to 1.4 g/cm³, preferably from 1.1 to 1.3 g/cm³;

a melting point in a range from more than 155 to 235° C., preferably from 165 to 225° C.;

an MFR (210° C./2.16 kg, if $T_{m(EVOH)}$<230° C.; 230° C./2.16 kg, if 210° C.<$T_{m(EVOH)}$<230° C.) in a range from 1 to 25 g/10 min, preferably from 2 to 20 g/10 min;

an oxygen permeation rate in a range from 0.05 to 3.2 cm³·20 μm/m²·d·bar, preferably in a range from 0.1 to 2.5 cm³·20 μm/m²·d·bar.

Preferably at least one polymer layer, more preferably the inner polymer layer, or preferably all polymer layers, has or have a melting temperature below the melting temperature of the barrier substrate layer or of the barrier material layer or both. This is especially the case if the barrier substrate layer is formed of polymer. In this context, the melting temperatures of the at least one, more particularly of the inner polymer layer, and the melting temperature of the barrier substrate layer or of the barrier material layer, or both, differ preferably by at least 1 K, particularly preferably by at least 10 K, more preferably still by at least 50 K, with further preference at least 100 K. The temperature difference ought preferably to be selected only at a level that does not result in melting of the barrier substrate layer or of the barrier material layer or both in the course of the folding.

Barrier Material Layer

As barrier material layer it is possible to use any material which seems suitable to the person skilled in the art for this purpose and which has a sufficient barrier effect, especially with respect to oxygen or water vapour or both. According to one preferred embodiment, the barrier material layer may take the form of a film or a deposited layer. A deposited barrier material layer is generated, for example, by vapour deposition of the barrier substrate layer with the barrier material. A preferred technique for this purpose is that of physical vapour deposition (PVD) or that of—preferably plasma-assisted—chemical vapour deposition (CVD). The barrier material layer is preferably an uninterrupted layer.

Layers of the Sheet-Like Composite

The layers of the layer sequence are joined to one another. Two layers are joined to one another when their adhesion to one another goes beyond van der Waals attraction forces. Layers joined to one another are preferably one selected from the group consisting of sealed together, adhesively bonded together, and pressed together, or a combination of at least two thereof. Unless otherwise indicated, the layers in a layer sequence may follow one another indirectly, in other words with one or at least two intermediate layers, or directly, in other words without an intermediate layer. This is particularly the case with the formulation wherein one layer overlies another layer. A formulation in which a layer sequence comprises listed layers means that at least the stated layers are present in the stated order. This formulation does not necessarily mean that these layers follow one another directly. A formulation in which two layers adjoin one another means that these two layers follow one another directly and therefore without an intermediate layer. This formulation, however, does not say anything about whether the two layers are joined to one another or not. On the contrary, these two layers may be in contact with one another. Preferably, however, these two layers are joined to one another.

Polymer Layers

Hereinafter, the term "polymer layer" refers in particular to the inner polymer layer, the intermediate polymer layer and the outer polymer layer. A preferred polymer is a polyolefin. The polymer layers can have further constituents. The polymer layers are preferably introduced into or applied to the sheet-like composite material in an extrusion process. The further constituents of the polymer layers are preferably constituents which do not adversely affect the behaviour of the polymer melt during application as a layer. The further constituents can, for example, be inorganic compounds, such as metal salts, or further plastics, such as further thermoplastics. However, it is also conceivable that the further constituents are fillers or pigments, for example carbon black or metal oxides. Possible suitable thermoplastics for the further constituents are in particular those easily processable owing to good extrusion behaviour. These suitably include polymers obtained by chain polymerization, especially polyesters or polyolefins, particular preference being given to cyclic olefin copolymers (COC), polycyclic olefin copolymers (POC), especially polyethylene and polypropylene, and very particular preference being given to polyethylene. Preferred polyethylenes are HDPE (high density polyethylene), MDPE (medium density polyethylene), LDPE (low density polyethylene), LLDPE (linear low density polyethylene) and VLDPE (very low density polyethylene) and also mixtures of at least two thereof. It is also possible to use mixtures of at least two thermoplastics. Suitable polymer layers have a melt flow rate (MFR) in a range from 1 to 25 g/10 min, preferably in a range from 2 to 20 g/10 min and particularly preferably in a range from 2.5 to 15 g/10 min, and a density in a range from 0.890 g/cm$^3$ to 0.980 g/cm$^3$, preferably in a range from 0.895 g/cm$^3$ to 0.975 g/cm$^3$, and more preferably in a range from 0.900 g/cm$^3$ to 0.970 g/cm$^3$. The polymer layers preferably have at least one melting temperature in a range from 80 to 155° C., preferably in a range from 90 to 145° C. and particularly preferably in a range from 95 to 135° C.

Inner Polymer Layer

The inner polymer layer is based on thermoplastic polymers, it being possible for the inner polymer layer to comprise a particulate inorganic solid. However, it is preferred that the inner polymer layer contains a thermoplastic polymer to an extent of at least 70% by weight, preferably at least 80% by weight and particularly preferably at least 95% by weight, based in each case on the total weight of the inner polymer layer. Preferably, the polymer or the polymer mixture of the inner polymer layer has a density (as per ISO 1183-1:2004) in a range from 0.900 to 0.980 g/cm$^3$, particularly preferably in a range from 0.900 to 0.960 g/cm$^3$ and most preferably in a range from 0.900 to 0.940 g/cm$^3$. The polymer is preferably a polyolefin, an mPolymer or a combination of both.

Outer Polymer Layer

The outer polymer layer preferably comprises a polyethylene or a polypropylene or both. Preferred polyethylene in this context encompasses LDPE and HDPE and also mixtures of these. A preferred outer polymer layer comprises an LDPE to an extent of at least 50% by weight, preferably at least 60% by weight, more preferably at least 70% by weight, more preferably still at least 80% by weight, most preferably at least 90% by weight, based in each case on the weight of the outer polymer layer.

Carrier Layer

It is possible to use as carrier layer any material which seems suitable for this purpose to the person skilled in the art and which has a sufficient strength and rigidity to give the container enough stability for said container to substantially maintain its shape in the filled state. This is particularly a necessary feature of the carrier layer, since the invention relates to the technical field of dimensionally stable containers. Such dimensionally stable containers are to be fundamentally distinguished from pouches and bags, which are usually made from thin films. In addition to a range of plastics, preference is given to plant-based fibrous materials, especially chemical pulps, preferably sized, bleached and/or unbleached chemical pulps, particular preference being given to paper and cardboard. Therefore, a preferred carrier layer contains a multiplicity of fibres. The basis weight of the carrier layer is preferably in a range from 120 to 450 g/m$^2$, particularly preferably in a range from 130 to 400 g/m$^2$ and most preferably in a range from 150 to 380 g/m$^2$. A preferred cardboard generally has a single-layer or multilayer construction and can be coated on one side or on both sides with one cover layer or else multiple cover layers. Furthermore, a preferred cardboard has a residual moisture of less than 20% by weight, preferably from 2% to 15% by weight and particularly preferably from 4% to 10% by weight, based on the total weight of the cardboard. A particularly preferred cardboard has a multilayer construction. More preferably, the cardboard has, on the surface pointing to the surroundings, at least one ply, but particularly preferably at least two plies, of a cover layer, which is known to a person skilled in the art as a "paper coating". Furthermore, a preferred cardboard has a Scott bond value (as per Tappi T403 μm) in a range from 100 to 360 J/m$^2$, preferably from 120 to 350 J/m$^2$ and especially preferably from 135 to 310 J/m². The aforementioned ranges make it possible to provide a composite from which a container of high tightness can be folded easily and within small tolerances.

The carrier layer is characterized by a bending resistance, which can be measured at a bending angle of 15° using a bending measurement instrument as per ISO 2493-2:2011. The bending measurement instrument used is an L&W Bending Tester code 160 from Lorentzen & Wettre, Sweden. The carrier layer preferably has, in a first direction, a bending resistance in a range from 80 to 550 mN. In the case of a carrier layer containing a multiplicity of fibres, the first direction is preferably an orientation direction of the fibres. A carrier layer containing a multiplicity of fibres further preferably has, in a second direction perpendicular to the first direction, a bending resistance in a range from 20 to 300 mN. The samples used for measuring the bending resistance using the above measurement instrument have a width of 38 mm and a clamping length of 50 mm. A preferred sheet-like composite having the carrier layer has a bending resistance in the first direction in a range from 100 to 700 mN. Further preferably, the aforementioned sheet-like composite has, in the second direction, a bending resistance in a range from 50 to 500 mN. The samples of the sheet-like composite that are used for measurement using the above measurement instrument also have a width of 38 mm and a clamping length of 50 mm.

Adhesion/Adhesion Promoter Layer

An adhesion promoter layer can be situated between layers which are not directly adjacent to one another, preferably between the barrier layer and the inner polymer layer. This adhesion promoter layer is also referred to herein as first adhesion promoter layer. Possible adhesion promoters in an adhesion promoter layer are all plastics which are suited as a result of functionalization by means of suitable functional groups for generating a firm connection as a result of the formation of ionic bonds or covalent bonds to a surface of a particular adjacent layer. Preferably, they are functionalized polyolefins, especially acrylic acid copolymers, obtained by copolymerization of ethylene with acrylic acids such as acrylic acid, methacrylic acid, crotonic acid, acrylates, acrylate derivatives or double-bond-bearing carboxylic anhydrides, for example maleic anhydride, or at least two thereof. Preference is given thereamong to polyethylene-maleic anhydride graft polymers (EMAH), ethylene-acrylic acid copolymers (EAA) or ethylene-methacrylic acid copolymers (EMAA), which are, for example, sold under the trade names Bynel® and Nucre®0609HSA by DuPont or Escor®6000ExCo by ExxonMobil Chemicals.

With further preference, adhesion promoters contemplated also include ethylene-alkyl acrylate copolymers. Selected preferably as alkyl group is a methyl, ethyl, propyl, isopropyl, butyl, isobutyl or a pentyl group. With further preference the adhesion promoter layer may contain mixtures of two or more different ethylene-alkyl acrylate copolymers. With preference similarly, the ethylene-alkyl acrylate copolymer may have two or more different alkyl groups in the acrylate function, an example being an ethylene-alkyl acrylate copolymer in which not only methyl acrylate units but also ethyl acrylate units are present in the same copolymer.

According to the invention, it is preferred that the adhesion between a carrier layer, a polymer layer or a barrier layer in relation to the particular next layer is at least 0.5 N/15 mm, preferably at least 0.7 N/15 mm and particularly preferably at least 0.8 N/15 mm. In one embodiment according to the invention, it is preferred that the adhesion between a polymer layer and a carrier layer is at least 0.3 N/15 mm, preferably at least 0.5 N/15 mm and particularly preferably at least 0.7 N/15 mm. Furthermore, it is preferred that the adhesion between a barrier layer and a polymer layer is at least 0.8 N/15 mm, preferably at least 1.0 N/15 mm and particularly preferably at least 1.4 N/15 mm. If a barrier layer indirectly follows a polymer layer via an adhesion promoter layer, it is preferred that the adhesion between the barrier layer and the adhesion promoter layer is at least 1.8 N/15 mm, preferably at least 2.2 N/15 mm and particularly preferably at least 2.8 N/15 mm. In a particular embodiment, the adhesion between the individual layers is strongly formed to the extent that, in an adhesion test, there is a tear of a carrier layer, a so-called cardboard fibre tear, in the case of a cardboard as carrier layer.

Polyolefin

A preferred polyolefin is a polyethylene (PE) or a polypropylene (PP) or both. A preferred polyethylene is one selected from the group consisting of an LDPE, an LLDPE, and an HDPE, or a combination of at least two thereof. A further preferred polyolefin is an mPolyolefin (polyolefin produced by means of a metallocene catalyst). Suitable polyethylenes have a melt flow rate (MFR=MFI−melt flow index) in a range from 1 to 25 g/10 min, preferably in a range from 2 to 20 g/10 min and particularly preferably in a range from 2.5 to 15 g/10 min, and a density in a range from 0.910 g/cm³ to 0.935 g/cm³, preferably in a range from 0.912 g/cm³ to 0.932 g/cm³, and more preferably in a range from 0.915 g/cm³ to 0.930 g/cm³.

mPolymer

An mPolymer is a polymer which has been produced by means of a metallocene catalyst. A metallocene is an organometallic compound in which a central metal atom is arranged between two organic ligands, such as, for example, cyclopentadienyl ligands. A preferred mPolymer is an mPolyolefin, preferably an mPolyethylene or an mPolypropylene or both. A preferred mPolyethylene is one selected from the group consisting of an mLDPE, an mLLDPE, and an mHDPE, or a combination of at least two thereof.

Extrusion

During extrusion, the polymers are usually heated to temperatures of from 210 to 350° C., measured on the molten polymer film below the exit at the extruder die. The extrusion can be achieved using extrusion tools which are known to a person skilled in the art and commercially available, such as, for example, extruders, extruder screws, feed blocks, etc. Situated at the end of the extruder is preferably an opening through which the polymer melt is pressed. The opening can have any shape which makes it possible to extrude the polymer melt. For example, the opening can be angular, oval or round. The opening preferably has the shape of a slot of a funnel. Once the melt layer has been applied to the substrate layer by means of the above-described process, the melt layer is left to cool down for the purpose of heat-setting, this cooling preferably being effected by quenching via contact with a surface which is kept at a temperature in a range from 5 to 50° C., especially preferably in a range from 10 to 30° C. Thereafter, at least the flanks are separated from the surface. The separation can be carried out in any manner which is familiar to a person skilled in the art and appears to be suitable for separating the flanks quickly and cleanly with maximum accuracy. Preferably, the separation is achieved by means of a knife, laser beam or water jet, or a combination of two or more thereof, particular preference being given to the use of knives, especially a cup wheel knife.

Lamination

In accordance with the invention, the overlaying of the carrier layer with the barrier layer may take place as a lamination. In that case the prefabricated carrier and barrier layers are joined by means of a suitable laminating agent. A preferred laminating agent comprises an intermediate polymer composition from which, preferably, an intermediate polymer layer is obtained. Furthermore, the preferred laminating agent preferably comprises a further adhesion promoter composition from which a further adhesion promoter layer is obtained. In that case the intermediate polymer composition or the further adhesion promoter composition, or both, are applied preferably by extrusion, more preferably by co-extrusion.

Colourants

Colourants contemplated are those known to the person skilled in the art and suitable for the present invention, including both solid and liquid colourants. According to DIN 55943:2001-10, colourant is the generic term for all colouring substances, especially for dyes and pigments. A preferred colourant is a pigment. A preferred pigment is an organic pigment. Pigments significant in connection with the invention are in particular the pigments mentioned in DIN 55943:2001-10 and the pigments mentioned in "Industrial Organic Pigments, Third Edition." (Willy Herbst, Klaus Hunger Copyright© 2004 WILEY-VCH Verlag GmbH & Co. KGaA, Weinheim ISBN: 3-527-30576-9). A pigment is a colourant which is preferably insoluble in the application medium. A dye is a colourant which is preferably soluble in the application medium.

Folding of the Sheet-Like Composite

The folding of the sheet-like composite is accomplished preferably in a temperature range from 10 to 50° C., preferably in a range from 15 to 45° C. and particularly preferably in a range from 20 to 40° C. This can be achieved by the sheet-like composite having a temperature in the above ranges. It is preferred, furthermore, for a folding tool, preferably together with the sheet-like composite, to have a temperature in the above ranges. For this purpose, the folding tool preferably does not possess a heating facility. Instead, the folding tool or else the sheet-like composite, or both, may be cooled. It is further preferred for the folding to take place at a temperature of not more than 50° C., as "cold folding", and for the joining to take place above 50° C., preferably above 80° C. and particularly preferably above 120° C., as "hot sealing". The above conditions and especially temperatures preferably also apply in the folding environment, as for example in the housing of the folding tool.

"Folding" is understood in accordance with the invention to be a procedure wherein an elongate bend, forming an angle, is produced in the folded sheet-like composite, preferably by means of a folding edge of a folding tool. In many cases, for this purpose, two adjacent surfaces of a sheet-like composite are bent increasingly towards one another. The folding produces at least two adjacent folded surfaces, which can then be joined at least in partial regions so as to form a container region. In accordance with the invention, the joining may be accomplished by any measure that appears to the person skilled in the art to be suitable and which enables a connection which is as gas-tight and liquid-tight as possible. The joining may be accomplished by sealing or adhesive bonding, or a combination of both measures. In the case of sealing, the join is created by means of a liquid and its solidification. In the case of adhesive bonding, chemical bonds which create the join are formed between the interfaces or surfaces of the two articles to be joined. In the case of sealing or adhesive bonding, it is advantageous in many cases to press against one another the surfaces that are to be sealed or bonded, respectively.

Food Products

The sheet-like composite and also the container precursor in connection with the invention are preferably formed for the production of a food product container. Furthermore, the inventive closed container is preferably a food product container. Food products contemplated are all foods known to a person skilled in the art for human consumption, and also animal feeds. Preferred food products are liquid above 5° C., examples being dairy products, soups, sauces and non-carbonated drinks.

Container Precursor

A container precursor is a preliminary stage of the closed container, and is formed in the production of a closed container. The container precursor in this case comprises the sheet-like composite as a blank. The sheet-like composite here may be unfolded or folded. A preferred container precursor is cut to size and formed for the production of an individual closed container. A preferred container precursor which has been cut to size and formed, for the production of a single closed container, is also referred to as a jacket or sleeve. The jacket or sleeve comprises the sheet-like composite in folded form. Moreover, the container precursor preferably has a shape of a lateral surface of a prism. A preferred prism is a cuboid. Furthermore, the jacket or sleeve comprises a longitudinal seam and is open in a head region and a base region. A typical container precursor which has been cut to size and formed, for the production of a multiplicity of closed containers, is often referred to as a tube.

A further preferred container precursor is open, preferably in a head region or a base region, particularly preferably in both. A preferred container precursor is sleeve-shaped or tubular or both. Another preferred container precursor comprises the sheet-like composite in such a way that the sheet-like composite is folded at least once, preferably at least twice, more preferably at least three times, most preferably at least four times. A preferred container precursor is formed in one piece. With particular preference a base region of the container precursor is formed in one piece with a lateral region of the container precursor.

Container

The inventive closed container can have a multiplicity of different shapes, but preference is given to an essentially cuboidal structure. Furthermore, the entire area of the container can be formed from the sheet-like composite, or the container can have a 2-part or multipart construction. In the case of a multipart construction, it is conceivable that, besides the sheet-like composite, use can also be made of other materials, for example plastic, which can be used especially in the head or base regions of the container. However, it is preferred here that the container is constructed from the sheet-like composite to an extent of at least 50%, particularly preferably to an extent of at least 70% and further preferably to an extent of at least 90% of the area. Furthermore, the container can have a device for emptying the contents. This device may, for example, be formed from a polymer or mixture of polymers and applied to the outer side of the container. It is also conceivable that said device is integrated into the container by direct injection moulding. According to a preferred embodiment, the inventive container has at least one edge, preferably from 4 to 22 or else more edges, particularly preferably from 7 to 12 edges. In the context of the present invention, edges are understood to mean regions arising during folding of an area. Exemplary edges include the longitudinal contact regions of two wall areas of the container in each case, also referred to herein as longitudinal edges. In the container, the container walls are preferably the areas of the container that are framed by the edges. Preferably, the interior of an inventive container contains a food product. Preferably, the closed container does not contain any lid or base, or both, not formed in one piece with the sheet-like composite. A preferred closed container contains a food product.

Hole

The at least one hole provided in the carrier layer according to preferred embodiments can have any shape which is known to a person skilled in the art and suitable for various closures or drinking straws. In many cases, the holes, in top view, have curves. For instance, the holes can be essentially circular, oval, elliptical or drop-shaped. The shape of the at least one hole in the carrier layer usually also predetermines the shape of the opening generated in the container either by an openable closure joined to the container, through which the contents of the container are dispensed from the container after opening, or by a drinking straw. This means that, in many cases, the openings of the opened container have shapes comparable or even identical to the at least one hole in the carrier layer. Embodiments of the sheet-like composite having a single hole are primarily used for releasing the food product situated in the container made from the sheet-like composite. A further hole can be provided especially for air supply to the container during the release of the food product.

In connection with the covering of the at least one hole of the carrier layer, it is preferred that the hole cover layers are joined to one another at least in part, preferably to an extent of at least 30%, preferably to an extent of at least 70% and particularly preferably to an extent of at least 90% of the area formed by the at least one hole. Furthermore, it is preferred that the hole cover layers are joined to one another at the edges of the at least one hole and are in contact with the edges preferably in a joined manner in order to thus achieve an improved tightness over a connection stretching across the entire hole area. In many cases, the hole cover layers are joined to one another over the region formed by the at least one hole in the carrier layer. This leads to a good tightness of the container formed from the composite and thus to a desired long shelf life of the foods kept in the container.

Opening/Opening Aid

In most cases, the opening in the container is generated by at least partial destruction of the hole cover layers covering the at least one hole. This destruction can be achieved by cutting, by pushing into the container or by pulling out from the container. The destruction can be achieved by means of an opening aid which is joined to the container and arranged in the region of the at least one hole, usually above the at least one hole, for example even by means of a drinking straw, which is jabbed through the hole cover layers. Furthermore, it is preferred in one embodiment according to the invention that an opening aid is provided in the region of the at least one hole. Here, it is preferred that the opening aid is provided on the area of the composite that represents the outer side of the container. Furthermore, the container preferably contains a closure, for example a lid, on the outer side of the container. In this connection, it is preferred that the closure covers the hole at least in part, preferably in full. Thus, the closure protects the hole cover layers, which are less robust compared to the regions beyond the at least one hole, from damaging mechanical action. For the opening of the hole cover layers covering the at least one hole, the closure in many cases comprises the opening aid. Suitable as such are, for example, hooks for tearing out at least a portion of the hole cover layers, edges or blades for cutting into the hole cover layers or spikes for pushing through the hole cover layers or a combination of at least two thereof. In many cases, these opening aids are mechanically coupled with a screw-on lid or a cap of the closure, for example via a hinge, and so the opening aid, with operation of the screw-on lid or the cap, acts on the hole cover layers in order to open the closed container. Occasionally, such closure systems, containing composite layers covering a hole, and openable closures covering said hole and having opening aids, are referred to in the specialist literature as "overcoated holes" with "applied fitments".

Measurement Methods

The following measurement methods were used in the context of the invention. Unless otherwise specified, the measurements were carried out at an ambient temperature of 23° C., an ambient air pressure of 100 kPa (0.986 atm) and a relative atmospheric humidity of 50%.

MFR Value

MFR value is measured in accordance with the standard ISO 1133-1:2012, Method A (mass determination method) (unless otherwise specified, at 190° C. and 2.16 kg).

Density

Density is measured in accordance with the standard ISO 1183-1:2013.

Melting Temperature

Melting temperature is determined on the basis of the DSC method ISO 11357-1, -5. Instrument calibration is done according to information from the manufacturer on the basis of the following measurements:

temperature indium—onset temperature,
heat of fusion indium,
temperature zinc—onset temperature.

Oxygen Permeation Rate

Oxygen permeation rate is determined in accordance with the standard ASTM D3985-05 (2010). The layer thickness of the test specimen is 90 μm±2 μm. The area of the test specimen is 50 cm$^2$. The measurements are made at an ambient temperature of 23° C., an ambient air pressure of 100 kPa (0.986 atm) and a relative atmospheric humidity of 50%. The testing instrument is an Ox-Tran 2/22 from Mocon, Neuwied, Germany.

Viscosity Number of PA

The viscosity number of PA is measured according to the standard DIN EN ISO 307 (2013) in 95% sulphuric acid.

Molecular Weight Distribution

The molecular weight distribution is measured by gel permeation chromatography by means of light scattering: ISO 16014-3/-5 (2009-09).

Cardboard Moisture Content

Cardboard moisture content is measured in accordance with the standard ISO 287:2009.

Adhesion

Adhesion between two adjacent layers is determined by fixing them on a 90° peel test instrument, for example "German rotating wheel fixture" from Instron, on a rotatable roller rotating at 40 mm/min during the measurement. The samples were cut beforehand into strips of 15 mm in width. On one side of the sample, the plies are detached from one another and the detached end is clamped into a pulling device directed vertically upwards. A measurement instrument for determining tensile force is attached to the pulling device. During rotation of the roller, the force required to separate the plies from one another is measured. Said force corresponds to the adhesion of the layers to one another and is specified in N/15 mm. The separation of the individual layers can, for example, be achieved mechanically, or by a specific pre-treatment, for example by soaking the sample for 3 min in 30% acetic acid warmed to 60° C.

Detection of Colourants

Detection of organic colourants can be carried out in accordance with the methods described in "Industrial Organic Pigments, Third Edition." (Willy Herbst, Klaus Hunger Copyright© 2004 WILEY-VCH Verlag GmbH & Co. KGaA, Weinheim ISBN: 3-527-30576-9).

Water Vapour Permeation Rate

The water vapour permeation rate is determined according to ASTM F1249-13. The layer thickness of the test specimen is 90 µm±2 µm. The area of the test specimen is 50 cm$^2$. The measurements are made at an ambient temperature of 23° C., an ambient air pressure of 100 kPa (0.986 atm) and a relative atmospheric humidity on one side of the test specimen of 100% relative humidity, and on the other side of the test specimen of 0% relative humidity. The testing instrument is a Permatran W model 3/33 from Mocon, Neuwied, Germany.

Layer Thickness

The layer thickness of a test specimen having an area of 0.5 cm$^2$ was determined using a scanning electron microscope (SEM). For this purpose, a cross section of the layer construction under determination was carried out by manual cutting with a blade (Leica Microtome Blades 819). The cross section was sputter-coated with gold (Cressington 108auto from Cressington Scientific Instruments Ltd., Watford (UK)) and then measured in the SEM (Quanta 450, FEI Deutschland GmbH, Frankfurt) under a high vacuum (p<7.0*10$^{-5}$ Pa). The layer thicknesses of the individual layers were determined and read off using the "xT Microscope Control" software, Version 6.2.11.3381, FEI Company, Frankfurt, Germany.

The invention is set out in more detail below by means of examples and drawings, with the examples and drawings not denoting any restriction on the invention. Furthermore, unless otherwise indicated, the drawings are not to scale.

Laminate Construction

For the examples (inventive) and comparative examples (non-inventive), laminates were prepared, in each case by layer extrusion processes, having the layer constructions and layer sequences indicated in Tables 1 to 7 below.

TABLE 1

Construction of the laminate as per inventive example 1
([1]available as MT5000 from Transparent Paper Ltd., Zürich, Switzerland)

| Layer designation | Material | Basis weight [g/m$^2$] |
|---|---|---|
| Outer polymer layer | LDPE 23L430 from Ineos GmbH, Cologne, Germany | 15 |
| Carrier layer | Cardboard: Stora Enso Natura T Duplex double-coated, Scott bond 200 J/m$^2$, residual moisture content 7.5% | 210 |
| Intermediate polymer layer | LDPE 23L430 from Ineos GmbH, Cologne, Germany | 18 |
| Further adhesion promoter layer | Ethylene-methyl acrylate copolymer Dow XZ89893 | 2 |
| Barrier layer[1] | Barrier substrate layer | BOPET | |
| | Barrier material layer | Aluminium | |
| First adhesion promoter layer | EAA; Escor 6000 from Exxon | 3 |
| Polymer layer | LDPE 19N430 from Ineos GmbH, Cologne, Germany | 20 |
| Inner polymer layer | Blend of (1) 65 wt % LDPE 19N430 from Ineos GmbH, Cologne, Germany and (2) 35 wt % Eltex 1315 AZ from Ineos GmbH, Cologne, Germany | 10 |

TABLE 2

Construction of the laminate as per inventive example 2
([2]available as IB-PET-P2 from DNP Europe, Düsseldorf, Germany)

| Layer designation | Material | Basis weight [g/m$^2$] |
|---|---|---|
| Outer polymer layer | LDPE 19N430 from Ineos GmbH, Cologne, Germany | 15 |
| Carrier layer | Cardboard: Stora Enso Natura T Duplex double-coated, Scott bond 200 J/m$^2$, residual moisture content 7.5% | 210 |
| Intermediate polymer layer | LDPE 19N430 from Ineos GmbH, Cologne, Germany | 18 |
| Further adhesion promoter layer | Ethylene-methyl acrylate copolymer Dow XZ89893 | 2 |
| Barrier layer[2] | Barrier substrate layer | BOPET | |
| | Barrier material layer | AlOx | |
| First adhesion promoter layer | EAA; Escor 6000 from Exxon | 3 |
| Polymer layer | LDPE 19N430 from Ineos GmbH, Cologne, Germany | 20 |
| Inner polymer layer | Blend of (1) 65 wt % LDPE 19N430 from Ineos GmbH, Cologne, Germany and (2) 35 wt % Eltex 1315 AZ from Ineos GmbH, Cologne, Germany | 10 |

TABLE 3

Construction of the laminate as per inventive example 3
([3]available as Ceramis from Amcor, Singen, Germany)

| Layer designation | Material | Basis weight [g/m$^2$] |
|---|---|---|
| Outer polymer layer | LDPE 23L430 from Ineos GmbH, Cologne, Germany | 15 |
| Carrier layer | Cardboard: Stora Enso Natura T Duplex double-coated, Scott bond 200 J/m$^2$, residual moisture content 7.5% | 210 |

TABLE 3-continued

Construction of the laminate as per inventive example 3
([3]available as Ceramis from Amcor, Singen, Germany)

| Layer designation | | Material | Basis weight [g/m$^2$] |
|---|---|---|---|
| Intermediate polymer layer | | LDPE 23L430 from Ineos GmbH, Cologne, Germany | 18 |
| Further adhesion promoter layer | | Ethylene-methyl acrylate Copolymer Dow XZ89893 | 2 |
| Barrier layer[3] | Barrier substrate layer | BOPP | |
| | Barrier material layer | SiOX | |
| First adhesion promoter layer | | EAA; Escor 6000 from Exxon | 3 |
| Polymer layer | | LDPE 19N430 from Ineos GmbH, Cologne, Germany | 20 |
| Inner polymer layer | | Blend of (1) 65 wt % LDPE 19N430 from Ineos GmbH, Cologne, Germany and (2) 35 wt % Eltex 1315 AZ from Ineos GmbH, Cologne, Germany | 10 |

TABLE 4

Construction of the laminate as per comparative example 1

| Layer designation | Material | Basis weight [g/m$^2$] |
|---|---|---|
| Outer polymer layer | LDPE 23L430 from Ineos GmbH, Cologne, Germany | 15 |
| Carrier layer | Cardboard: Stora Enso Natura T Duplex double-coated, Scott bond 200 J/m$^2$, residual moisture content 7.5% | 210 |
| Intermediate polymer layer | LDPE 23L430 from Ineos GmbH, Cologne, Germany | 18 |
| Further adhesion promoter layer | Escor 6000 HSC from Exxon Mobil Corporation | 3 |
| Barrier layer | Aluminium foil EN AW 8079 from Hydro Aluminium Deutschland GmbH | here: thickness 9 μm |
| First adhesion promoter layer | Coextrudate of (1) Escor 6000 HSC from Exxon Mobil Corporation and (2) LDPE 19N430 from Ineos GmbH, Cologne, Germany | (1) - 4 (2) - 22 |
| Inner polymer layer | Blend of (1) 65 wt % LDPE 19N430 from Ineos GmbH, Cologne, Germany and (2) 35 wt % Eltex 1315 AZ from Ineos GmbH, Cologne, Germany | 10 |

TABLE 5

Construction of the laminate as per comparative example 2

| Layer designation | Material | Basis weight [g/m$^2$] |
|---|---|---|
| Outer polymer layer | LDPE 23L430 from Ineos GmbH, Cologne, Germany | 15 |
| Carrier layer | Cardboard: Stora Enso Natura T Duplex double-coated, Scott bond 200 J/m$^2$, residual moisture content 7.5% | 210 |
| Further adhesion promoter layer | MAH-LDPE Yparex 9207, Yparex, Enschede, Netherlands | 4 |
| Barrier layer | EVOH, available as EVAL L171B from Kuraray, Düsseldorf, Germany | 5 |
| First adhesion promoter layer | MAH-LDPE (1) Yparex 9207, Yparex, Enschede, Netherlands, and (2) LDPE 19N430 from Ineos GmbH, Cologne, Germany | (1) - 4 (2) - 22 |
| Inner polymer layer | Blend of (1) 65 wt % LDPE 19N430 from Ineos GmbH, Cologne, Germany and (2) 35 wt % Eltex 1315 AZ from Ineos GmbH, Cologne, Germany | 10 |

TABLE 6

Construction of the laminate as per comparative example 3
([1]available as MT5000 from Transparent Paper Ltd., Zürich, Switzerland)

| Layer designation | | Material | Basis weight [g/m$^2$] |
|---|---|---|---|
| Outer polymer layer | | LDPE 19N430 from Ineos GmbH, Cologne, Germany | 15 |
| Carrier layer | | Cardboard: Stora Enso Natura T Duplex double-coated, Scott bond 200 J/m$^2$, residual moisture content 7.5% | 210 |
| Intermediate polymer layer | | LDPE 19N430 from Ineos GmbH, Cologne, Germany | 18 |
| Further adhesion promoter layer | | Ethylene-methyl acrylate copolymer Dow XZ89893 | 2 |
| Barrier layer[1] | Barrier material layer | Aluminium | |
| | Barrier substrate layer | BOPET | |
| First adhesion promoter layer | | EAA; Escor 6000 from Exxon | 3 |
| Polymer layer | | LDPE 19N430 from Ineos GmbH, Cologne, Germany | 20 |
| Inner polymer layer | | Blend of (1) 65 wt % LDPE 19N430 from Ineos GmbH, Cologne, Germany and (2) 35 wt % Eltex 1315 AZ from Ineos GmbH, Cologne, Germany | 10 |

TABLE 7

Construction of the laminate as per inventive example 4
([2]available as GL-AEC-F from Toppan Printing Co. LTD., Düsseldorf, Germany)

| Layer designation | | Material | Basis weight [g/m$^2$] |
|---|---|---|---|
| Outer polymer layer | | LDPE 19N430 from Ineos GmbH, Cologne, Germany | 15 |
| Carrier layer | | Cardboard: Stora Enso Natura T Duplex double-coated, Scott bond 200 J/m$^2$, residual moisture content 7.5% | 210 |
| Intermediate polymer layer | | LDPE 19N430 from Ineos GmbH, Cologne, Germany | 18 |
| Further adhesion promoter layer | | Ethylene-methyl acrylate copolymer Dow XZ89893 | 2 |
| Barrier layer[2] | Protective varnish | Hybrid polymer | |
| | Barrier material layer | AlOx | |
| | Barrier substrate layer | BOPET | |
| First adhesion promoter layer | | EAA; Escor 6000 from Exxon | 3 |
| Polymer layer | | LDPE 19N430 from Ineos GmbH, Cologne, Germany | 20 |
| Inner polymer layer | | Blend of (1) 65 wt % LDPE 19N430 from Ineos GmbH, Cologne, Germany and (2) 35 wt % Eltex 1315 AZ from Ineos GmbH, Cologne, Germany | 10 |

Laminate Production

The laminates are produced with an extrusion coating unit from Davis Standard. In this case the extrusion temperature is in a range of about 280 to 330° C. Deviations in the temperatures of ±6° C. are within normal tolerances. Deviations in the basis weights of ±3 g/m$^2$ are within normal tolerances. In the first step, the carrier layer, per each container to be produced, is provided with a hole, after which the outer polymer layer is applied to the carrier layer. In the second step, the barrier layer is applied, together with the further adhesion promoter layer and the intermediate polymer layer, to the carrier layer previously coated with the outer polymer layer. This second step is accomplished by lamination in inventive examples 1 to 3 and also in comparative examples 1, 3 and 4. In comparative example 2, the second step is accomplished by coextrusion. Thereafter the first adhesion promoter layer and the inner polymer layer are coextruded onto the barrier layer. To apply the individual layers by extrusion, the polymers are melted in an extruder. When a polymer is applied in a layer, the resulting melt is transferred via a feed block into a die and extruded onto the carrier layer. The oxygen permeation rate and the water vapour permeation rate are determined on the ungrooved and unfolded laminates, in accordance with the measurement methods described above.

Container Production

Grooves, more particularly longitudinal grooves, were made in the laminates obtained as described above, on the outer side. Furthermore, the grooved laminate was divided into blanks for individual containers, with each blank containing one of the above holes. By folding along the four longitudinal grooves of each blank and by sealing of overlapping folded areas, a jacket-like container precursor of the form shown in FIG. 3 was obtained in each case. From this jacket, in a CFA 712, standard filling machine from SIG Combibloc, Linnich, a closed container of the form shown in FIG. 4 (brick type) was produced. For this purpose, a base region was produced by folding and was closed by heat sealing. This produced a cup open at the top. The cup was sterilized using hydrogen peroxide. Additionally, the cup was filled with water. The head region of the cup, which contains the hole, was closed by folding and ultrasonic sealing, thereby obtaining a closed container. An opening aid was affixed to this container in the region of the hole. Laminate samples were taken from the containers thus produced, in each case in accordance with the measurement methods described above, and determinations were made of the oxygen permeation rate and the water vapour permeation rate.

Evaluation

The results of the investigations carried out as part of the inventive and comparative examples are summarized in the tables which follow.

TABLE 8

Evaluation of the measurements for the inventive examples and the non-inventive comparative examples; − = very high weight fraction of aluminium; + = high weight fraction of aluminium; ++ = low weight fraction of aluminium; +++ no aluminium.

| | Oxygen permeation rate [cm³/(m² · d · bar)] | | Water vapour permeation rate [g/(m² · d)] | | Metal content of the laminate [wt %] |
|---|---|---|---|---|---|
| | Before grooving and folding | After grooving and folding | Before grooving and folding | After grooving and folding | |
| Inventive example 1 | 0.6 | 0.6 | 0.3 | 1.1 | + |
| Inventive example 2 | 1.2 | 1.3 | 0.8 | 1.2 | ++ |
| Inventive example 3 | 0.1 | 0.2 | 0.1 | 0.8 | +++ |
| Comparative example 1 | 0.1 | 0.5 | 0.0 | 0.2 | − |
| Comparative example 2 | 0.5 | 3.5 | 1.4 | 2.0 | +++ |
| Comparative example 3 | 3.4 | 22.9 | 0.3 | 5.5 | ++ |
| Comparative example 4 | 0.1 | 2.7 | 0.3 | 1.4 | + |

In addition to the disadvantages of the non-inventive comparative examples, which are evident from Table 8, it should be borne in mind that the laminate of comparative example 4 includes an additional layer in the form of the protective varnish. To produce this laminate, therefore, a greater amount of starting material is consumed, which raises the production costs.

Furthermore, this additional layer must be made in the laminate in an additional method step, thereby prolonging the production method and making it more expensive. Furthermore, the additional layer increases the basis weight of the laminate, with adverse consequences for transport capacities.

Unless otherwise specified in the description or the particular figure.

Figure 1:
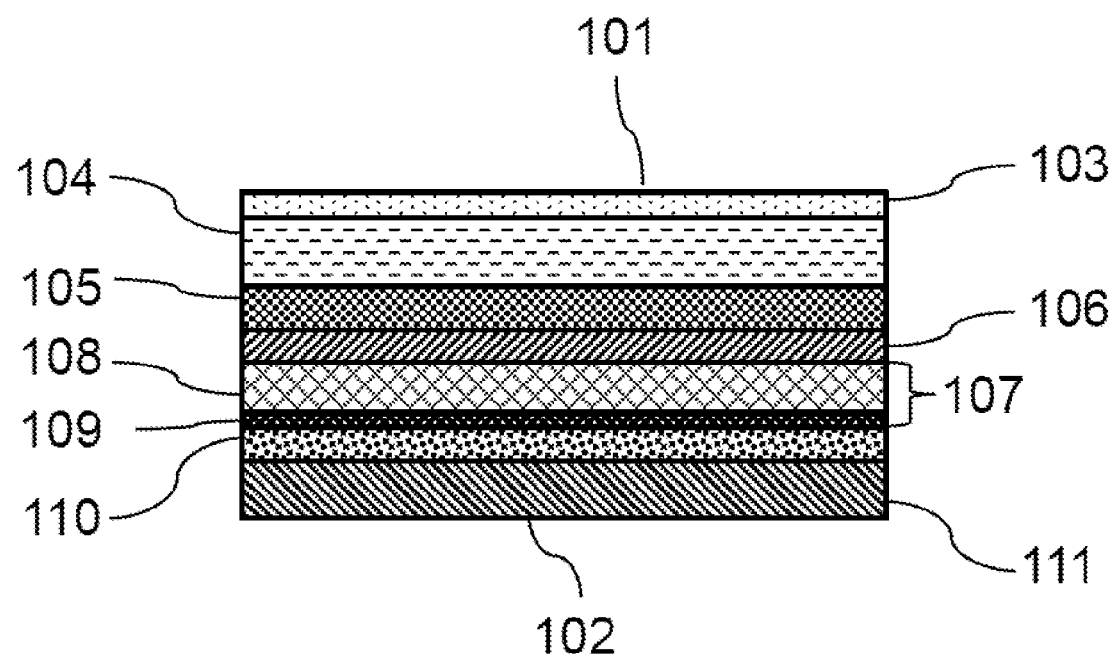
FIG. 1 shows a schematic depiction of a detail of an inventive sheet-like composite in cross section.

FIG. 1 shows a schematic depiction of a detail of an inventive sheet-like composite 100 in cross section. The sheet-like composite 100 consists of the following layers of a layer sequence in a direction from an outer side 101 of the sheet-like composite 100 to an inner side 102 of the sheet-like composite 100: an outer polymer layer 103, a carrier layer 104, an intermediate polymer layer 105, a further adhesion promoter layer 106, a barrier layer 107, a first adhesion promoter layer 110 and an inner polymer layer 111. The aforesaid layers are identical to those of inventive example 3 described above. Accordingly, the barrier layer 107 consists of a barrier substrate layer 108 and a barrier material layer 109 as sublayers. The barrier material layer 109 was obtained by physical vapour deposition onto the barrier substrate layer 108. The barrier substrate layer 108 and the barrier material layer 109 as well are identical to those in example 3. The barrier material layer 107 thus has a thickness of 500 nm. As can be seen in FIG. 1, the barrier substrate layer 108 adjoins the barrier material layer 109. Furthermore, the barrier material layer 109 is located on a side of the barrier substrate layer 108 that faces the inner side 102 of the sheet-like composite 100. The barrier layer 107 has a thickness of 12 µm.

Figure 2:
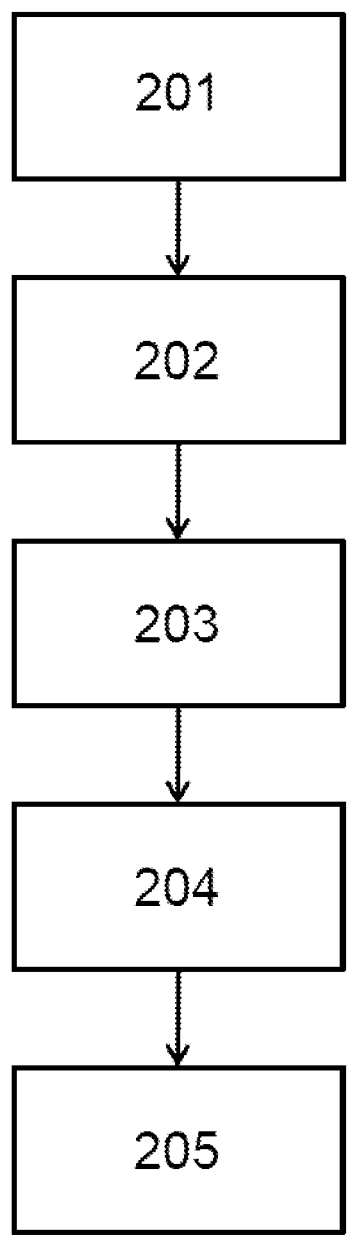
FIG. 2 shows a flow chart of an inventive method for producing a sheet-like composite.

FIG. 2 shows a flow chart of an inventive method 200 for producing the sheet-like composite 100 of FIG. 1. The method 200 comprises a method step a) 201, in which a sheet-like composite precursor is provided. The sheet-like composite precursor comprises, as adjacent layers, an outer polymer layer 103 and a carrier layer 104. The sheet-like composite precursor was obtained by applying an outer polymer composition by extrusion to a layer surface of the carrier layer 104. From the outer polymer composition, the outer polymer layer 103 of the sheet-like composite precursor was obtained. Furthermore, in method step a) 201, a barrier layer 107 is provided, composed of a barrier substrate layer 108 and a barrier material layer 109 adjacent thereto. The barrier material layer 109 has a thickness of 500 nm. The barrier layer 107 has a thickness of 12 µm. In a method step b) 202, the carrier layer 104 is joined to the barrier layer 107 by lamination. In this procedure, an intermediate polymer layer 105 and a further adhesion promoter layer 106 are introduced between the barrier layer 107 and the carrier layer 104. The individual layers are joined to one another in such a way as to produce the layer sequence shown in FIG. 1. In a method step c) 203, the barrier layer 107 is coated, on a layer surface of the barrier layer 107 that faces away from the carrier layer 104, with a first adhesion promoter composition, thereby obtaining a first adhesion promoter layer 110. In a method step d) 204, the barrier layer 107 is overlaid, on a side of the barrier layer 107 that faces away from the carrier layer 104, with an inner polymer composition, thereby obtaining an inner polymer layer 111. Here, method steps c) 203 and d) 204 preferably take place simultaneously, and the first adhesion promoter composition and the inner polymer composition are preferably coextruded. In a method step I) 205, the sheet-like composite 100 according to FIG. 1, obtained above, is grooved. For this purpose, a grooving tool acts on the outer side 101 of the sheet-like composite 100 and produces linear depressions in the carrier layer 104, which are called grooves.

Figure 3:
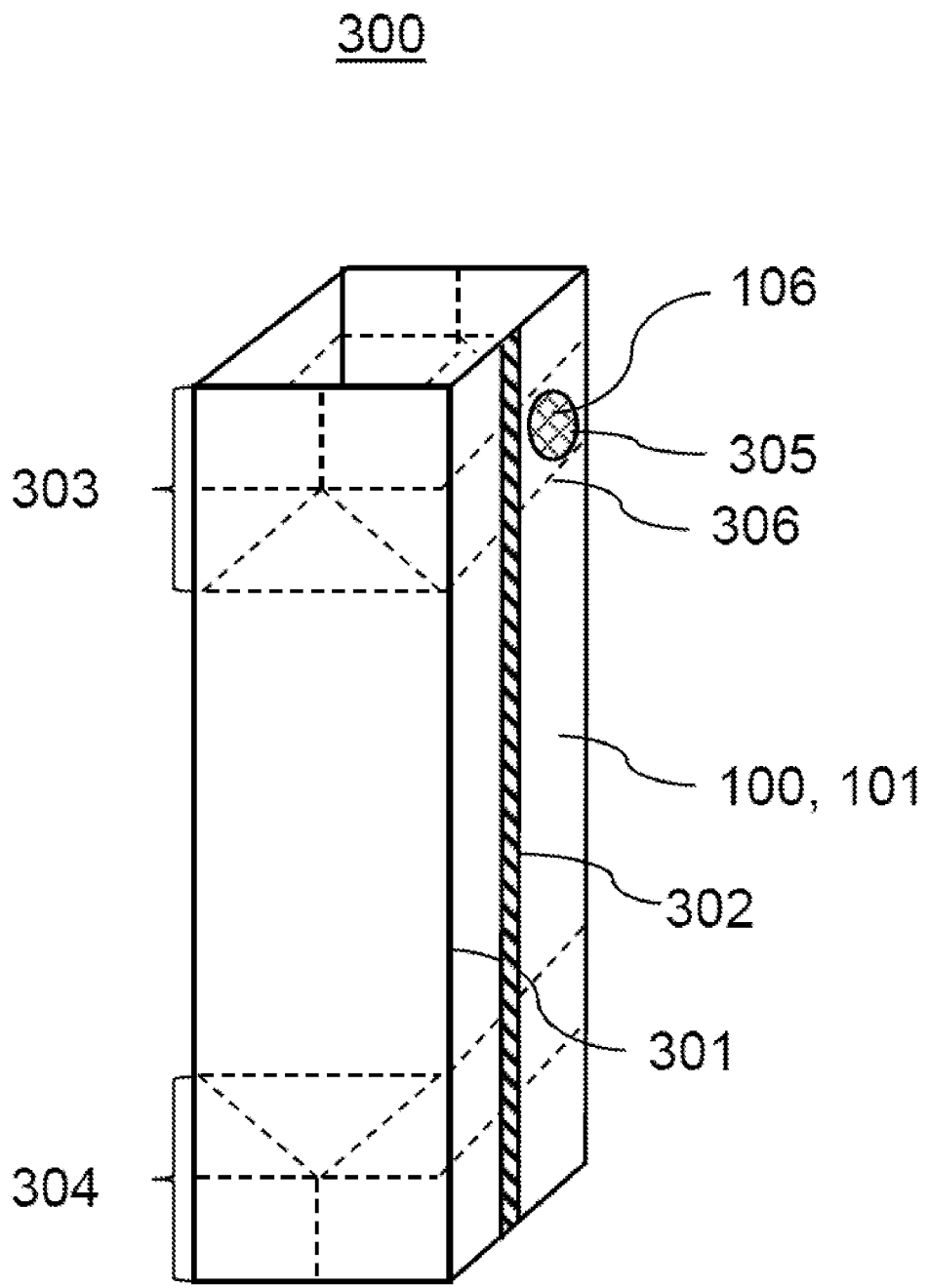
FIG. 3 shows a schematic depiction of an inventive container precursor.

FIG. 3 shows a schematic depiction of an inventive container precursor 300. The container precursor 300 contains the sheet-like composite 100 of FIG. 1 with 4 longitudinal folds 301, which each form a longitudinal edge 301. The sheet-like composite 100 is a blank for producing an individual closed container 400. The container precursor 300 is jacket-like and contains a longitudinal seam 302, in which a first longitudinal edge and a further longitudinal edge of the sheet-like composite 100 are sealed together. Furthermore, the container precursor 300 contains a hole 305 in the carrier layer 104. The hole 305 is covered by the outer polymer layer 103 (not shown), the intermediate polymer layer 105 (not shown), the further adhesion promoter layer 106, the barrier layer 107, the first adhesion promoter layer 110 (not shown) and the inner polymer layer 111 (not shown) as hole cover layers. By folding along grooves 306 and joining folded regions in a head region 303 and a base region 304 of the container precursor 300, it is possible to obtain a closed container 400. Such a closed container 400 is depicted in FIG. 4.

Figure 4:
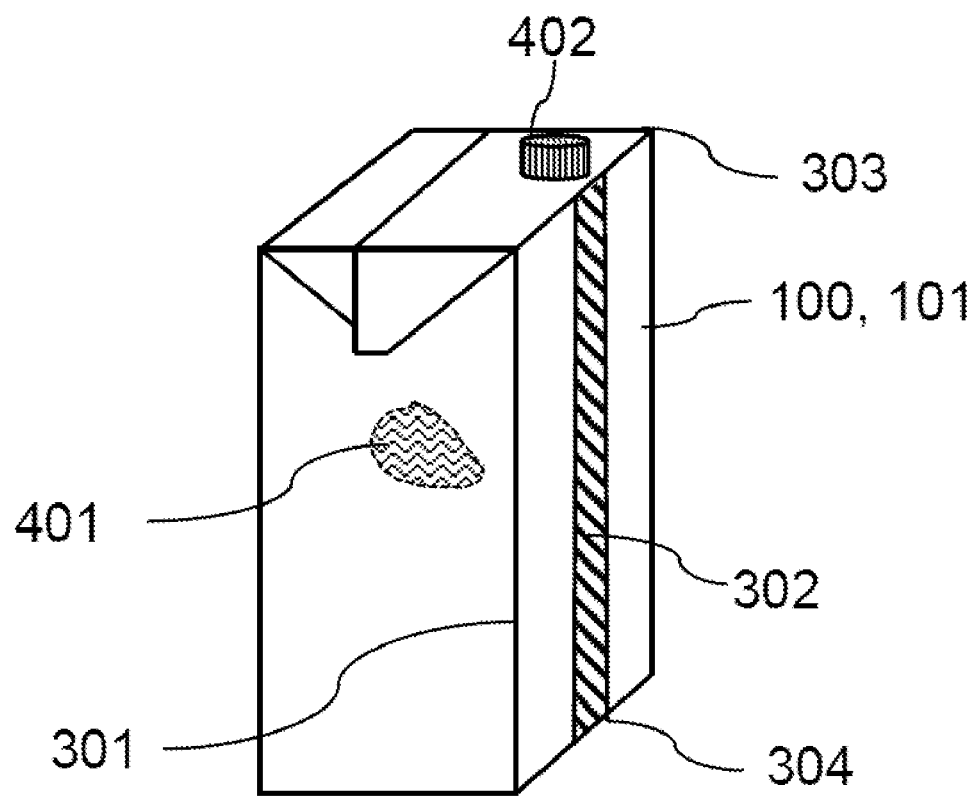
FIG. 4 shows a schematic depiction of an inventive closed container.

FIG. 4 shows a schematic depiction of an inventive closed container 400. The closed container 400 was produced from the container precursor 300 according to FIG. 3. The closed container 400 contains a food product 401 and has 12 edges. Furthermore, the closed container 400 is joined to a lid having an opening aid 402, which lid covers the hole 305 on the outer side 101 of the sheet-like composite 100. Here, the lid 402 contains, in its interior, a cutting tool as opening aid. The closed container 400 surrounds an internal volume of 200 ml.

Figure 5:
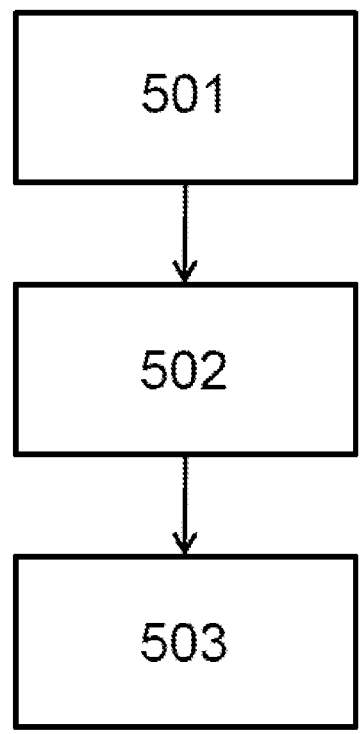
FIG. 5 shows a flow chart of an inventive method for producing a container precursor.

FIG. 5 shows a flow chart of an inventive method 500 for producing a container precursor 300. In a method step A. 501, the sheet-like composite 100 according to FIG. 1 is provided. This composite contains a first longitudinal edge and a further longitudinal edge. In a method step B. 502, the sheet-like composite 100 is folded. In a method step C. 503, the first longitudinal edge and the further longitudinal edge are pressed on top of one another and joined to one another by heat sealing. Thus, a longitudinal seam 302 is obtained. The container precursor 300 according to FIG. 3 is produced according to what has been described above.

Figure 6:
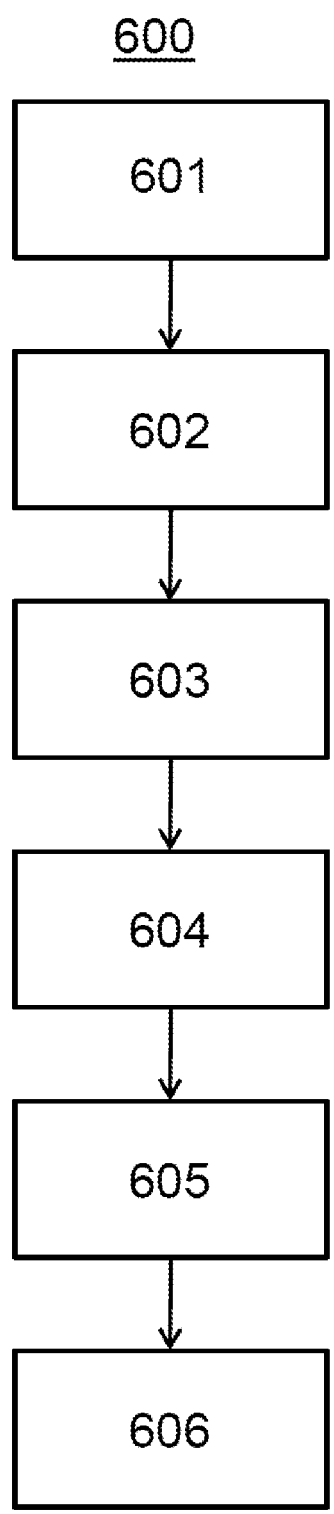
FIG. 6 shows a flow chart of an inventive method for producing a closed container, in a schematic manner and in a manner which is not true to scale.

FIG. 6 shows a flow chart of an inventive method 600 for producing a closed container 400. In a method step i. 601, the container precursor 300 according to FIG. 3 is provided. In a method step ii. 602, a base region 304 of the container precursor 300 is formed by folding of the sheet-like composite 100. In a method step iii. 603, the base region 304 is closed by sealing with hot air with a temperature of 300° C. In a method step iv. 604, the container precursor 300 is filled with a food product 401, and, in a method step v. 605, the container precursor 300 is closed by sealing in a head region 303, thereby obtaining the closed container 400 of FIG. 4. In a method step vi. 606, the closed container 400 is joined to an opening aid 402.

LIST OF REFERENCE SIGNS

100 Inventive sheet-like composite
101 Outer side
102 Inner side
103 Outer polymer layer
104 Carrier layer
105 Intermediate polymer layer
106 Further adhesion promoter layer
107 Barrier layer
108 Barrier substrate layer
109 Barrier material layer
110 First adhesion promoter layer
111 Inner polymer layer
200 Inventive method for producing a sheet-like composite
201 Method step a)
202 Method step b)
203 Method step c)
204 Method step d)
205 Method step I)
300 Inventive container precursor
301 Longitudinal fold/longitudinal edge
302 Longitudinal seam
303 Head region
304 Base region
305 Hole
306 Groove
400 Inventive closed container
401 Food product
402 Lid with opening aid
500 Inventive method for producing a container precursor
501 Method step A.
502 Method step B.
503 Method step C.
600 Inventive method for producing a closed container
601 Method step i.
602 Method step ii.
603 Method step iii.
604 Method step iv.
605 Method step v.
606 Method step vi.

The invention claimed is:

1. A sheet-like composite comprising as layers of a layer sequence in a direction from an outer side of the sheet-like composite to an inner side of the sheet-like composite
   a) a carrier layer, and
   b) a barrier layer comprising
      i) a barrier substrate layer, and
      ii) a barrier material layer;
   wherein the barrier material layer has a thickness in a range from 1 nm to 800 nm;
   wherein any barrier material layer having a thickness in a range from 1 nm to 800 nm overlies the barrier substrate layer only on a layer surface of the barrier substrate layer that faces the inner side,
   wherein the barrier material layer comprises a barrier material to an extent of at least 60% by weight, based on the weight of the barrier material layer,
   wherein the barrier material is an elemental metal; and
   wherein the barrier layer has at least one of the following features:
      a. an oxygen permeation rate in a range from 0.1 to 40 $cm^3/(m^2 \cdot d \cdot bar)$; and
      b. a water vapour permeation rate in a range from 0.1 to 40 $g/(m^2 \cdot d)$.

2. The sheet-like composite according to claim 1, wherein the barrier layer has a thickness in a range from 2 to 35 µm.

3. The sheet-like composite according to claim 1, wherein the barrier substrate layer adjoins the barrier material layer.

4. The sheet-like composite according to claim 1, wherein the barrier substrate layer comprises a polymer to an extent of at least 50% by weight, based on the weight of the barrier substrate layer, the polymer being selected from the group consisting of a polycondensate, a polypropylene, a polyvinyl alcohol, or a combination of at least two thereof.

5. The sheet-like composite according to claim 1, wherein the sheet-like composite contains a linear depression on the outer side.

6. The sheet-like composite according to claim 1, wherein the barrier layer is characterized by an aluminium content of less than 50% by weight, based on the weight of the barrier layer.

7. The sheet-like composite according to claim 1, wherein a layer surface of the barrier layer that faces the inner side of the sheet-like composite adjoins a first adhesion promoter layer, the first adhesion promoter layer comprising an acrylic acid copolymer.

8. The sheet-like composite according to claim 1, wherein a layer surface of the barrier layer that faces the outer side of the sheet-like composite adjoins a further adhesion promoter layer, the further adhesion promoter layer comprising an ethylene-alkyl acrylate copolymer.

9. The sheet-like composite according to claim 1, wherein the sheet-like composite further comprises an outer polymer layer,
the outer polymer layer
overlying the carrier layer on a side of the carrier layer that faces the outer side of the sheet-like composite, and
comprising an LDPE to an extent of at least 50% by weight, based on the weight of the outer polymer layer.

10. The sheet-like composite according to claim 1, wherein the sheet-like composite further comprises an inner polymer layer,
the inner polymer layer overlying the barrier layer on a side of the barrier layer that faces the inner side of the sheet-like composite.

11. The sheet-like composite according to claim 1, wherein the sheet-like composite further comprises an intermediate polymer layer between the carrier layer and the barrier layer,
wherein the intermediate polymer layer comprises an LDPE to an extent of at least 50% by weight, based on the weight of the intermediate polymer layer.

12. The sheet-like composite according to claim 1, wherein the sheet-like composite further comprises an intermediate polyolefin layer between the carrier layer and the barrier layer.

13. The sheet-like composite according to claim 1, wherein the barrier substrate layer comprises a biaxially oriented polymer.

14. The sheet-like composite according to claim 1, wherein the carrier layer contains one selected from the group consisting of cardboard, paper board and paper, or a combination of at least two thereof.

15. A method for producing the sheet-like composite according to claim 1, the method comprising as method steps
a) providing
i) a sheet-like composite precursor, containing the carrier layer, and
ii) the barrier layer; and
b) overlaying the carrier layer with the barrier layer, thereby obtaining the sheet-like composite;
wherein, during the overlaying in method step b), the barrier material layer is located on a side of the barrier substrate layer that faces away from the carrier layer.

16. The method according to claim 15, wherein the barrier layer has a thickness in a range from 2 to 35 μm.

17. The method according to claim 15, wherein the barrier substrate layer adjoins.

18. The method according to claim 15, wherein the barrier substrate layer comprises a polymer to an extent of at least 50% by weight, based on the weight of the barrier substrate layer, the polymer being selected from the group consisting of a polycondensate, a polypropylene, a polyvinyl alcohol, or a combination of at least two thereof.

19. The method according to claim 15, wherein the method further comprises a method step
c) contacting a layer surface of the barrier layer that faces away from the carrier layer with a first adhesion promoter composition, thereby obtaining a first adhesion promoter layer,
the first adhesion promoter composition comprising an acrylic acid copolymer.

20. The method according to claim 15, wherein the method further comprises a method step
d) overlaying the barrier layer on a side of the barrier layer that faces away from the carrier layer with an inner polymer composition, thereby obtaining an inner polymer layer.

21. The method according to claim 15, wherein the barrier layer is characterized by an aluminium content of less than 50% by weight, based on the weight of the barrier layer.

22. A method, comprising as method steps
A. providing the sheet-like composite according to claim 1, comprising a first longitudinal edge and a further longitudinal edge;
B. folding the sheet-like composite; and
C. contacting the first longitudinal edge with the further longitudinal edge and joining the first longitudinal edge to the further longitudinal edge, thereby obtaining a longitudinal seam.

23. A method, comprising as method steps
i. providing a container precursor comprising a sheet-like composite according to claim 1;
ii. forming a base region of the container precursor by folding the sheet-like composite;
iii. closing the base region;
iv. filling the container precursor with a food product, and
v. closing the container precursor in a head region, thereby obtaining a closed container.

* * * * *